United States Patent
Ichioka et al.

(10) Patent No.: US 8,270,803 B2
(45) Date of Patent: Sep. 18, 2012

(54) IMAGE RECORDING AND REPRODUCING APPARATUS, AND IMAGE REPRODUCING METHOD

(75) Inventors: Hidetoshi Ichioka, Tokyo (JP); Takaaki Maeda, Tokyo (JP); Mutsumi Kogawa, Kanagawa (JP); Shinichi Wakai, Tokyo (JP); Hitoshi Kimura, Kanagawa (JP)

(73) Assignee: Sony Corporation (JP)

(*) Notice: Subject to any disclaimer, the term of this patent is extended or adjusted under 35 U.S.C. 154(b) by 992 days.

(21) Appl. No.: 11/021,038

(22) Filed: Dec. 23, 2004

(65) Prior Publication Data

US 2005/0180728 A1 Aug. 18, 2005

(30) Foreign Application Priority Data

Dec. 24, 2003 (JP) ................. P2003-426287

(51) Int. Cl.
H04N 9/80 (2006.01)
(52) U.S. Cl. .............................................. 386/240
(58) Field of Classification Search ............... 386/46, 386/68, 95, 109, 125
See application file for complete search history.

(56) References Cited

U.S. PATENT DOCUMENTS

| | | | | |
|---|---|---|---|---|
| 5,822,493 A * | 10/1998 | Uehara et al. | | 386/285 |
| 6,374,404 B1 * | 4/2002 | Brotz et al. | | 725/46 |
| 6,396,500 B1 * | 5/2002 | Qureshi et al. | | 345/473 |
| 6,490,407 B2 * | 12/2002 | Niida | | 386/69 |
| 6,580,870 B1 * | 6/2003 | Kanazawa et al. | | 386/95 |
| 6,807,570 B1 * | 10/2004 | Allen et al. | | 709/219 |
| 7,043,546 B2 * | 5/2006 | Smith et al. | | 709/224 |
| 7,047,489 B2 * | 5/2006 | Kanno et al. | | 715/277 |
| 7,050,097 B2 * | 5/2006 | Schick et al. | | 348/239 |
| 7,123,813 B2 * | 10/2006 | Inoue | | 386/248 |
| 7,149,982 B1 * | 12/2006 | Duperrouzel et al. | | 715/788 |
| 7,178,106 B2 * | 2/2007 | Lamkin et al. | | 715/716 |
| 7,212,725 B2 * | 5/2007 | Gunji et al. | | 386/243 |
| 7,313,809 B1 * | 12/2007 | Mohan et al. | | 725/109 |
| 7,428,707 B2 * | 9/2008 | Quimby | | 715/738 |
| 7,444,588 B2 * | 10/2008 | Hill et al. | | 715/255 |
| 7,475,349 B2 * | 1/2009 | Wagner et al. | | 715/716 |
| 7,533,400 B1 * | 5/2009 | Hailey et al. | | 725/49 |
| 2001/0005442 A1 * | 6/2001 | Ueda et al. | | 386/46 |
| 2003/0160814 A1 * | 8/2003 | Brown | | 345/732 |
| 2004/0047607 A1 * | 3/2004 | Seo et al. | | 386/95 |

(Continued)

FOREIGN PATENT DOCUMENTS

JP 10-301748 A 11/1998

(Continued)

Primary Examiner — William C Vaughn, Jr.
Assistant Examiner — Gelek W Topgyal
(74) Attorney, Agent, or Firm — Lerner, David, Littenberg, Krumholz & Mentlik, LLP

(57) ABSTRACT

A reproducing operation of still image content and a reproducing operation of moving image content are carried out by similar inputs by a user. A video recording and reproducing processing unit reproduces video content, and a Web content processing unit automatically selects instructions, such as information for instructing another Web page to be displayed next, from data of a reproduced Web page, and reproduces the another Web page. As a result, a plurality of Web pages are continuously reproduced and output at predetermined time intervals. A main control unit controls the reproduction of video content by the video recording and reproducing processing unit and the continuous reproduction of Web content by the Web content processing unit based on signals input by operations to a single group of operating keys as interpreted by an input conversion table.

11 Claims, 12 Drawing Sheets

U.S. PATENT DOCUMENTS

2004/0086267 A1* 5/2004 Ogawa et al. .................. 386/95
2005/0050576 A1* 3/2005 Upendran et al. ............ 725/110

FOREIGN PATENT DOCUMENTS

| | | |
|---|---|---|
| JP | 11-143674 A | 5/1999 |
| JP | 11-150693 A | 6/1999 |
| JP | 2000-112976 A | 4/2000 |
| JP | 2001-211408 A | 8/2001 |
| JP | 2002-094946 A | 3/2002 |
| JP | 2003-015809 A | 1/2003 |

* cited by examiner

IMAGE RECORDING AND REPRODUCING APPARATUS, AND IMAGE REPRODUCING METHOD

CROSS-REFERENCE TO RELATED APPLICATIONS

The present application claims priority from Japanese Application No. 2003-426287 filed Dec. 24, 2003, the disclosure of which is hereby incorporated by reference herein.

BACKGROUND OF THE INVENTION

This invention relates to an image recording and reproducing apparatus which is capable of recording moving image content and still image content on a recording medium, and also of reproducing each content recorded on the recording medium, and to an image reproducing method in the image recording and reproducing apparatus.

In recent years, digital broadcasting by use of a BS (Broadcasting Satellite), a CS (Communication Satellite), etc. has become popular, and along with this, a digital broadcasting receiver which is capable of receiving digital broadcasts has attracted attention. In addition, an image recording and reproducing apparatus which records data of content received by the digital broadcasting receiver on a high-capacity recording medium, such as a writing-type DVD (Digital Versatile Disk) and an HDD (Hard Disk Drive), has also been realized.

On one hand, an imaging device such as a digital still camera, which is capable of taking an image and recording it as digital data, has been widely used. There are many cases in which still image data recorded by such imaging device is transferred to a PC (Personal Computer), etc., and images are displayed on a display and printed based on this data. However, there recently has been a high demand to be able to readily browse such still images without using a PC. Further, in recent years, the Internet has been widely used, and it has become popular to browse Web pages by PC, etc., but with regard to these Web pages, there also has been a high demand that they be able to be readily browsed.

To address such demands, consideration has been given to display still image content, such as still images taken by an imaging device and Web pages, on a television receiver. For example, an image recording and reproducing apparatus may be equipped with a slot for a portable-type memory card using a non-volatile semiconductor memory, together with a function of recording received broadcast images as digital data on a high-capacity recording medium such as an HDD, and may be capable of taking in data of still images taken and recorded by a digital still camera, and of reproducing and outputting the still images. In addition, an image recording and reproducing apparatus may be equipped with a communication I/F (Interface), and may be connected to the Internet and capable of displaying Web pages.

Further, there is an image storage device which is connected through a signal connector to a digital still camera, and which takes in and stores image data recorded in this still camera, and when it receives a control signal from a television receiver through the signal connector, it reads out the stored image data and outputs still image signals based on this image data to a television receiver so that it is capable of displaying still images (e.g., see Japanese Published Application No. JP-A-2000-341614 (paragraph numbers [0057]~[0126], FIG. 1)(corresponding U.S. publications: 2003011702, 2003011680, 2003011681, 2003011703, 2003025797, 2003025809, 2003025806, 2003035054, 2003048364)). In addition, there is a television receiver in which, when a digital still camera is mounted on a digital still camera mounting portion, image data recorded in the digital still camera is automatically transferred and stored in an internal high-capacity storage device (e.g., see, Japanese Published Application No. JP-A-2000-354227 (paragraph numbers [0183]~[0186], FIG. 50)(corresponding U.S. publications: 2003011702, 2003011680, 2003011681, 2003011703, 2003025797, 2003025809, 2003025806, 2003035054, 2003048364)).

In addition, with regard to stored images, it is common to reproduce and display them by, for example, displaying their thumbnail images on a screen of a television receiver in the form of a list, and by selecting an arbitrary image data file from among the displayed images. Further, a display method called a slide show, in which stored image data is read out one after another and reproduced and displayed continuously at predetermined time intervals, is also known.

As described above, an image recording and reproducing apparatus equipped with a function of reproducing and outputting still images and a function of displaying still image content such as Web pages, together with a function of recording moving image content received through broadcasts on a recording medium and reproducing and outputting the content, is known. However, in such conventional image recording apparatus, the operating procedure at the time of reproducing the recorded moving images is completely different from the operating procedure at the time of reproducing still image content such as still images and Web pages. For example, an input operation to the image recording apparatus is often carried out by a remote controller, but in order to display the above-described still image content on a display device, there is a need for an operating button different from that for controlling reproduction of moving images to be disposed on the remote controller, or for the relevant function to be activated from a menu screen and a pop-up menu, etc. Accordingly, a user who is familiar with the operations for reproducing moving images is required to master unfamiliar new operations so as to display still image content and to switch screens on a case-by-case basis, and so on, which is a problem with respect to the ease and understandability of how the apparatus is operated.

In addition, when browsing Web pages, a next Web page is normally displayed by selecting a link anchor on a Web page through a user operation. But when browsing Web pages by use of a television receiver, it is not easy to specify a position where a link anchor exists, and an operation which is comfortable to a user is needed.

SUMMARY OF THE INVENTION

An object of the invention is to provide an image recording and reproducing apparatus with high operability which is capable of carrying out not only a reproducing operation of moving image content, but also a reproducing operation of still image content viscerally.

In addition, another object of the invention is to provide an image reproducing method in an image recording and reproducing apparatus by which operability is heightened by enabling not only a reproducing operation of moving image content to be carried out, but also a reproducing operation of still image content viscerally.

In order to resolve the above-described problems, the invention provides an image recording and reproducing apparatus operable to record moving image content and still image content on a recording medium, and to reproduce the content. The apparatus includes a moving image content reproducing unit operable to reproduce the moving image content; a still image content reproducing unit operable to continuously reproduce a plurality of the still image contents at predetermined time intervals; a group of operating keys operable to input instructing signals to the image recording and reproducing apparatus; and an operation control unit operable to control a reproducing operation by the moving image content reproducing unit and a continuous reproducing operation by the still image content reproducing unit, the operation control unit controlling both the reproducing operation and the continuous reproducing operation based on instructing signals input by the same operating keys within the group of operating keys.

In addition, the invention provides an image reproducing method in an image recording and reproducing apparatus operable to record moving image content and still image content on a recording medium, and to reproduce the content. The image reproducing method includes inputting first instructions using a first group of operating keys, the first instructions controlling a reproducing process by which the moving image content is reproduced; and inputting second instructions using the first group of operating keys, the second instructions controlling a continuous reproducing process by which a plurality of the still image contents are continuously reproduced at predetermined time intervals.

In the image recording and reproducing apparatus and the image reproducing method, moving image content is reproduced by the moving image content reproducing unit, and a plurality of the still image contents are continuously reproduced by the still image content reproducing unit. Then, a reproducing operation by which the moving image content is reproduced, and a continuous reproducing operation by which a plurality of the still image contents are continuously reproduced at predetermined time intervals are controlled based on instructing signals input by the same operating keys within a group of operating keys.

According to the invention, a reproducing operation by which the moving image content is reproduced and a continuous reproducing operation by which a plurality of the still image contents are continuously reproduced at predetermined time intervals are controlled based on instructing signals input by the same operating keys within a group of operating keys, and therefore, a user who is familiar with operations for controlling reproduction of moving images can viscerally carry out control operations for reproducing still image content. In addition, it is unnecessary to provide separate sets of operating keys for use in reproducing moving image content and for use in reproducing still image content.

In addition, if the still image content is, for example, Web pages, the still image content reproducing unit may automatically select instruction information for instructing another Web page to be displayed next from data of reproduced Web pages, and reproduce a Web page which corresponds to the selected instruction information, and thereby, a continuous reproducing operation is carried out. As a result, it is possible for a user to reproduce Web pages with almost the same feeling as that at the time of reproducing moving image content.

BRIEF DESCRIPTION OF THE DRAWINGS

The invention, together with further advantages thereof, may best be understood by reference to the following description taken in conjunction with the accompanying drawings in which.

DETAILED DESCRIPTION

Hereinafter, the invention will be described as applied to an image recording and reproducing apparatus which is capable of receiving television broadcasts and outputting moving image signals on a display device, recording the received moving images on a recording medium as digital data, and reading out, reproducing and outputting the moving images.

Figure 1:
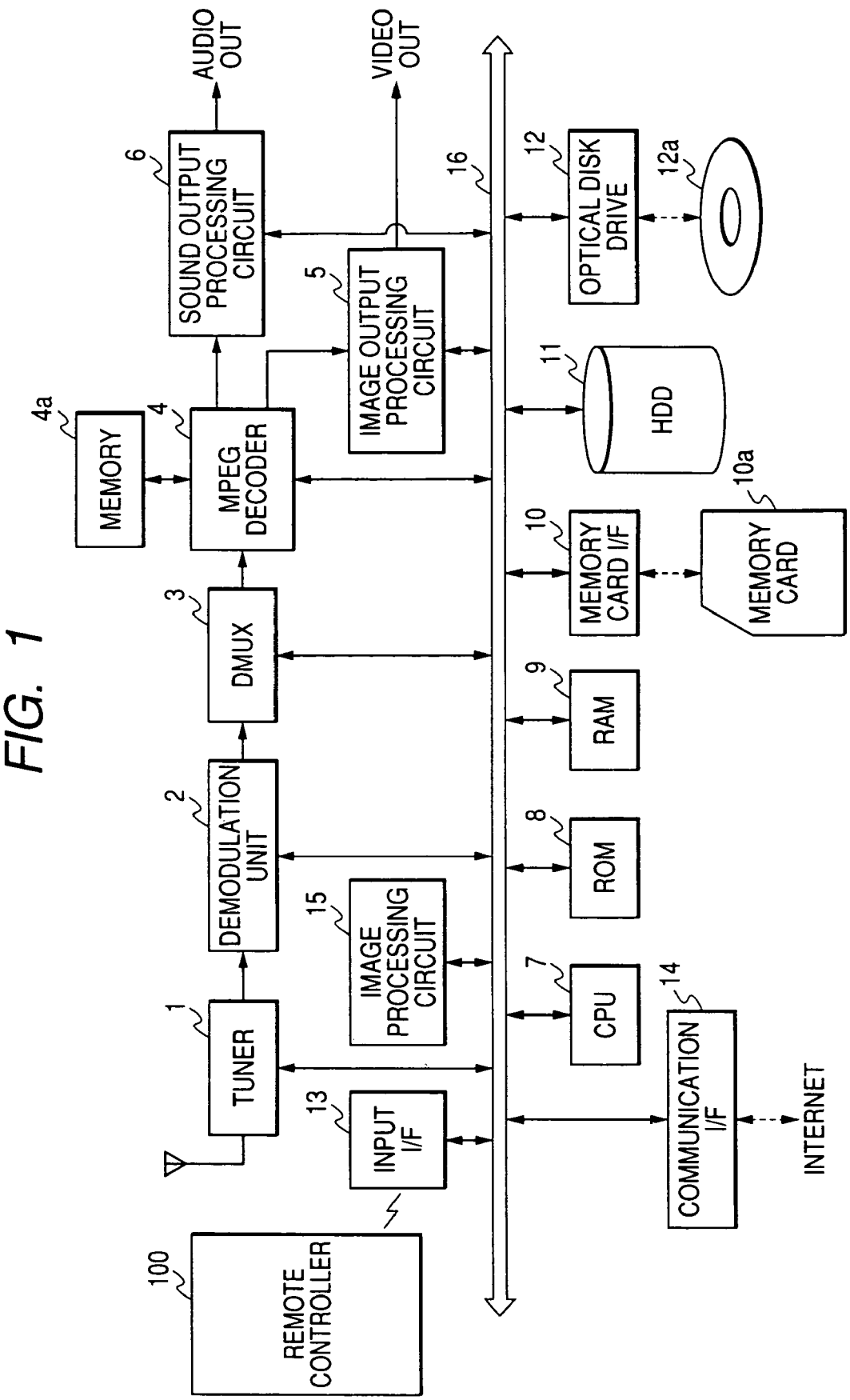
FIG. 1 is a block diagram which shows the internal configuration of an image recording and reproducing apparatus which relates to an embodiment of the invention.

FIG. 1 is a block diagram which shows the internal configuration of an image recording and reproducing apparatus which relates to an embodiment of the invention.

FIG. 1 shows, as an example, the configuration of an image recording and reproducing apparatus which is capable of receiving and recording digital broadcasts. This image recording and reproducing apparatus is equipped with a tuner 1, a demodulation unit 2, a DMUX (Demultiplexer) 3, an MPEG (Moving Picture Experts Group) decoder 4, an image output processing circuit 5, a sound output processing circuit 6, a CPU (Central Processing Unit) 7, a ROM (Read Only Memory) 8, a RAM (Random Access Memory) 9, a memory card I/F (interface) 10, an HDD 11, an optical disk drive 12, an input I/F 13, a communication I/F 14, an image processing circuit 15, and an internal bus 16. In addition, a detachable memory card 10a, which is composed of a non-volatile semiconductor memory, is mounted on the memory card I/F 10, and a detachable optical disk medium 12a, such as a read-only or writable DVD or CD, is mounted on the optical disk drive 12a.

The tuner 1 receives an input of broadcast radio waves which were received by an external antenna, selects a signal with a predetermined carrier frequency in accordance with an instruction from CPU 7, and outputs the selected reception signal to the demodulation unit 2. The broadcast radio waves may be, for example, terrestrial waves or satellite waves which were relayed by a BS or CS. In addition, the broadcast signals may be received through a wire cable.

The demodulation unit 2 applies QPSK (Quadrature Phase Shift Keying) demodulation and error correction processing to the broadcast signals from the tuner 1, and outputs a transport stream to the DMUX 3. Meanwhile, if scramble-processed broadcast signals were received, program viewing and listening contract information is extracted from reception signals from the tuner 1 and transferred to the CPU 7, and, for a transport stream which the CPU 7 determines can be viewed and listened to, descramble processing is applied to the data of the transport stream by the use of key information supplied from CPU 7.

DMUX 3 separates additional information for use in data broadcasting, such as moving image data, sound data, and an EPG (Electronic Program Guide), from the transport stream supplied from the demodulation unit 2. In this embodiment, moving image data and sound data are supplied as a moving image stream and a sound stream which were encoded by an MPEG system, separated in DMUX 3, and then supplied to the MPEG decoder 4. In addition, DMUX 3 can also supply the separated moving image stream and the sound stream to HDD 11 and the optical disk drive 12 through the internal bus 16. In addition, the separated additional information for use in the data broadcasts is supplied to CPU 7 through the internal bus 16.

The MPEG decoder 4 applies expansion decoding processing in accordance with the MPEG system to the moving image stream and the sound stream which were supplied from the DMUX 3, the HDD 11 and the optical disk drive 12. The demodulated moving image data is output to the image output processing circuit 5, and the sound data is output to the sound output processing circuit 6. Meanwhile, the MPEG decoder 4 may be equipped with a memory 4a for exclusive use as a working area at the time of processing.

The image output processing circuit 5 combines data of GUI (Graphical User Interface) images and OSD (On Screen Display) images generated by the image processing circuit 15, with moving image data demodulated by the MPEG decoder 4, still image data demodulated by CPU 7, and image data of Web pages generated according to need, converts this data into, for example, analog image signals of the NTSC (National Television Standards Committee) system, and outputs it to an external display, etc.

The sound output processing circuit 6 combines the data of additional sounds to an input operation, which was output by the processing of CPU 7, with sound data decoded by the MPEG decoder 4, according to need, converts the data into an analog sound signal, and outputs it to an external amplifier, etc.

CPU 7 controls each unit in the image recording and reproducing apparatus by executing a program stored in ROM 8 and/or HDD 11. In addition, it carries out processing such as expansion decoding, resizing, and format conversion, etc. of still image data, and browse processing of Web page data received through the Internet.

ROM 8 stores an OS (Operating System) and BIOS (Basic Input/Output System), an application program and other various data in advance. RAM 9 temporarily stores at least a part of a program which is executed by CPU 7, and various data necessary for processing by this program.

The memory card I/F 10 is an I/F circuit which is equipped with a card slot (not shown in the figure) into which the memory card 10a is loaded, and which controls data writing and reading operations to the memory card 10a. The loaded memory card 10a records still image data, etc. transferred from an external digital still camera and PC, etc.

HDD 11 is a storage device with a relatively high-capacity, such as 100 Gbyte, which is capable of recording long moving image data, and carries out data writing and reading operations on the basis of a command and address information which are designated by CPU 7. HDD 11 records data of broadcast content such as moving image streams and sound streams, additional information for use in data broadcasting, still image data which was read out from the memory card 10a, data of Web pages which were received through the Internet, and so on. In addition, a program to be executed by CPU 7, data necessary for execution thereof and so on are stored therein.

The optical disk drive 12 is equipped with a drive device and a drive circuit into which an optical disk medium 12a is loaded and in which data reading and writing are carried out. The optical disk medium 12a records data, etc. of broadcast content which were received in this image recording and reproducing apparatus or another device.

The input I/F 13 is equipped with, for example, a receiving circuit which receives infrared signals from an external remote controller 100, an operation key by which a user carries out a manual operation, and so on, and supplies a control signal to CPU 7 in response to an input operation of a user.

The communication I/F 14 is an I/F circuit for carrying out communication after it is connected to the Internet, and more particularly, is disposed as an I/F circuit for connecting with, for example, a LAN (Local Area Network), and is connected to the Internet through external network connection equipment.

The image processing circuit 15 generates data of GUI images for carrying out viewing of and listening to received television video, recording and reproducing of images and sounds by use of various recording mediums, viewing of and listening to Web pages, and so on, OSD images for displaying various information, and so on, and outputs these images to the image output processing circuit 5.

Here, a basic operation in this image recording and reproducing apparatus will be described.

In the image recording and reproducing apparatus of this embodiment, it is possible to output broadcast content which is composed of moving images and sounds received by broadcast radio waves, video content which is composed of moving images and sounds recorded on the HDD 11 and the optical disk medium 12a, still images recorded on the memory card 10a and the HDD 11, etc. (hereinafter, referred to as photo content) and Web pages which are received through the communication I/F 14 (hereinafter, referred to as Web content), in general classification. In addition, the broadcast content may include additional information, etc. for use in data broadcasting, which was received together with the moving images and sounds. Then, the received broadcast content can be recorded on the HDD 11 and the optical disk medium 12a, and the recorded content is also included in the video content.

When a user views and listens to broadcast content of a digital broadcast, CPU 7 outputs channel select information to the tuner 1 on the basis of a control signal from the input I/F 13, and the tuner 1 selects reception signals with a carrier frequency which corresponds to the input channel select information, and outputs them to the demodulation unit 2. The demodulation unit 2 applies QPSK demodulation and error correction processing to the broadcast signals, and the DMUX 3 separates a moving image stream, a sound stream, and additional information for use in data broadcasting from the processed transport stream.

The MPEG decoder 4 applies expansion decoding processing to the separated moving image stream and sound stream.

The decoded moving image stream is output to, for example, an external display, through the image output processing circuit 5, and as a result, received broadcast images are displayed. In addition, the sound stream is output to, for example, an external amplifier, through the sound output processing circuit 6, and sounds are output from a speaker.

Meanwhile, if scramble-processed broadcast signals are received, descramble processing is applied to the broadcast signals from the tuner 1 after they are demodulated by the demodulation unit 2. In this case, the image recording and reproducing apparatus may further include an I/F for a memory card in which contract information of a program and key information for descramble processing, etc. are written, CPU 7 reads out the contract information from this memory card, and the demodulation unit 2 extracts the contract information from the received broadcast signals, and supplies it to CPU 7. CPU 7 cross-checks the contract information, reads key information from the memory card if it is determined that it is possible to view and listen to the broadcast content, and supplies the broadcast signals to the demodulation unit. The demodulation unit 2 carries out descramble processing by use of the supplied key information.

In addition, the additional information for use in data broadcasting, which was separated in DMUX 3, is supplied to the image output processing circuit 5 together with data of predetermined OSD images coming from the image processing circuit 15, in response to an input operation from a user through the input I/F 13, and is displayed together with the moving images.

Next, if the received broadcast content is recorded on, for example, HDD 11, the moving image stream and the sound stream, which were separated in DMUX 3, are supplied to and recorded on HDD 11 through the internal bus 16.

In addition, when video content recorded on HDD 11 is reproduced, a moving image stream and a sound stream which correspond to the video content are read out and supplied to the MPEG decoder 4, an expansion decoding process is applied thereto, and image signals and sound signals are output to the outside.

It is also possible to record the received broadcast content on the optical disk medium 12*a* by similar processing. In addition, it is also possible to reproduce and output data of images and sounds recorded on the optical disk medium 12*a*.

Next, in the case of reproducing and outputting photo content recorded on the memory card 10*a*, expansion decoding is applied by CPU 7 to compressed data of still images read out from the memory card 10*a*, and the expanded images are output to the image output processing circuit 5 together with data of predetermined GUI images and OSD images from the image processing circuit 15. As a result, still images are combined with the GUI images and OSD images, and are reproduced and output on an external display.

It is also possible to record the compressed data of still images read out from the memory card 10*a* onto the HDD 11 and the optical disk medium 12*a*, and further, to reproduce and output the still images recorded on these devices. Further, it is also possible to output a "slide show" in which still image data which was recorded on the memory card 10*a* and the HDD 11, etc. is read out sequentially and the images are continuously reproduced at predetermined time intervals.

On one hand, in the case of displaying Web content, when data of a Web page is received through the communication I/F 14, image data based upon the received data is generated by the processing of CPU 7, and is output to the image output processing circuit 5 together with data of predetermined GUI images from the image processing circuit 15. As a result, images of Web pages are combined at a predetermined position in the GUI image, and are reproduced and output on an external display.

Then, when a predetermined link in this Web page is selected through the input I/F 13, a URL (Uniform Resource Locator) which corresponds to this link is accessed through the communication I/F 14, and data of a corresponding Web page is received, reproduced and output in the same manner. Further, it is also possible to automatically change Web pages at predetermined time intervals by automatically selecting a predetermined link in the displayed Web page. Hereinafter, this function will be referred to as "automatic link".

Figure 2:
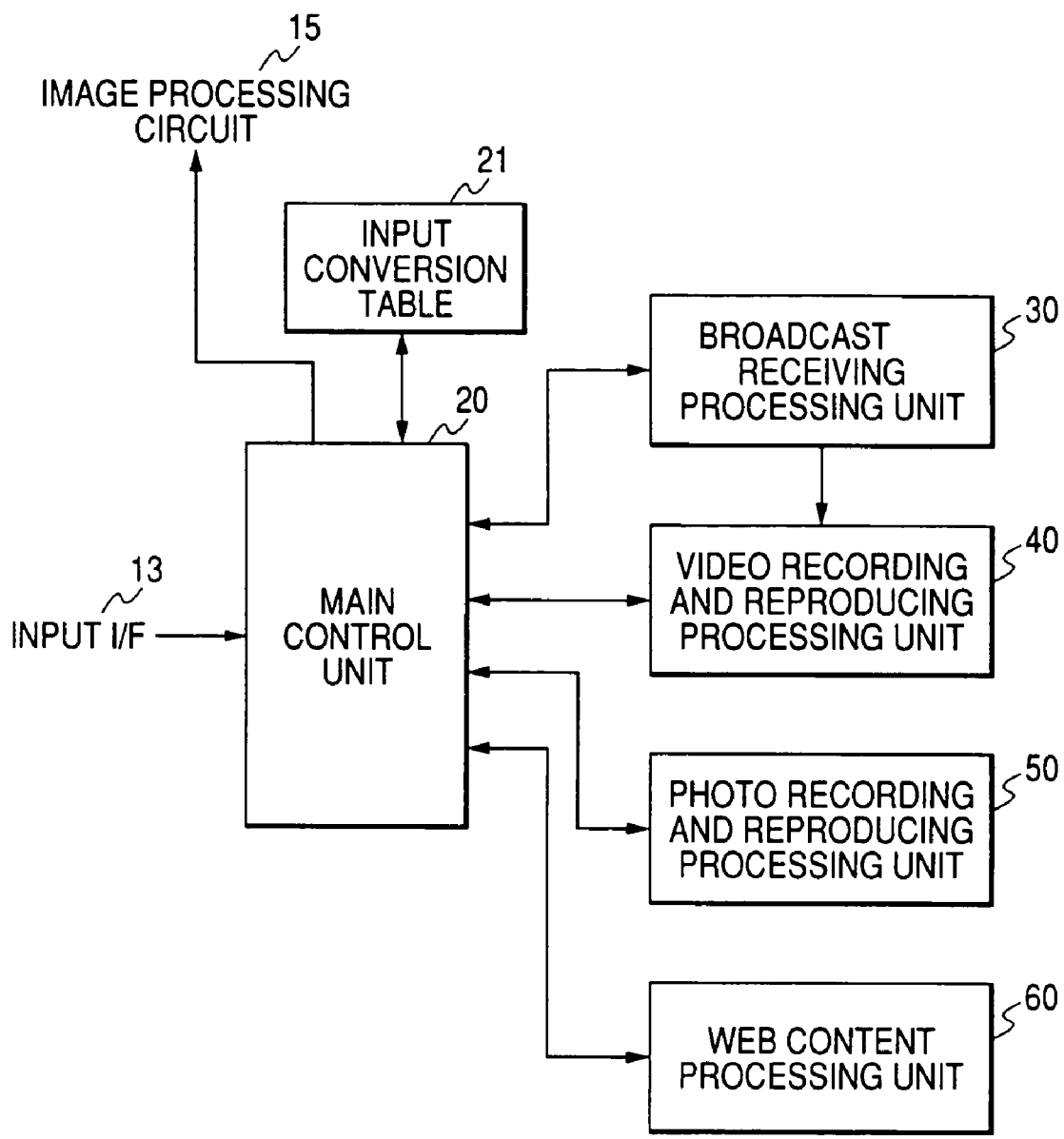
FIG. 2 is a block diagram which shows a major functional configuration of the image recording and reproducing apparatus.

Next, FIG. 2 is a block diagram which shows the major functional configuration of the image recording and reproducing apparatus described above.

As shown in FIG. 2, the image recording and reproducing apparatus is equipped with a main control unit 20, a broadcast receiving processing unit 30, a video recording and reproducing processing unit 40, a photo recording and reproducing processing unit 50, and a Web content processing unit 60. These functional blocks are realized as program modules which are stored in ROM 8 and HDD 11, and executed by CPU 7. In addition, an input conversion table 21 is connected to the main control unit 20. The input conversion table 21 is stored in ROM 8 or HDD 11.

The main control unit 20 is a functional block for controlling all of the operations of the image recording and reproducing apparatus, such as processing of an input signal from the input I/F 13, and controlling operations in accordance with each of the content classifications described above. The main control unit 20 outputs control signals to the broadcast receiving processing unit 30, the video recording and reproducing processing unit 40, the photo recording and reproducing processing unit 50, the Web content processing unit 60, the image processing circuit 15 and so on, in accordance with an input signal from the input I/F 13, and controls the operation of these devices.

In addition, the input conversion table 21 is a table for converting input information from the input I/F 13, which receives infrared signals from the remote controller and then processes them, in accordance with an operation mode which corresponds to the type of content to be reproduced. The main control unit 20 controls operations with reference to this input conversion table 21, and it is thereby possible for a user who operates the image recording and reproducing apparatus to reproduce and output photo content and Web content by an operation which is close to an occasion of reproducing and outputting video content recorded on the HDD 11 and the optical disk medium 12*a*, as described later.

The broadcast receiving processing unit 30 is, as described above, a functional block which receives the broadcast content, applies expansion decoding thereto, controls the output of reproduction signals, carries out channel selection by the tuner 1, and controls the operation of demodulation unit 2, DMUX 3, MPEG decoder 4, image output processing circuit 5 and sound output processing circuit 6, all in response to instructions from the main control unit 20. In addition, when recording the received broadcast contents on the HDD 11 and the optical disk medium 12*a*, moving image streams, sound streams and additional information, which were separated by DMUX 3, are supplied to the video recording and reproducing processing unit 40.

The video recording and reproducing processing unit 40 is, as described above, a functional block for recording broadcast content to the HDD 11 and the optical disk medium 12*a*, and also for reading out video content recorded in each recording medium and reproducing and outputting them. At the time of recording, it receives the moving image stream, sound stream and additional information which were separated by DMUX 3, and writes them in each recording medium. In addition, at the time of reproduction, it reads out data from each recording medium and supplies the moving image stream and sound stream to the MPEG decoder 4.

The photo recording and reproducing processing unit 50 is a functional block for reproducing photo content, such as images which were taken by, for example, a digital still camera, etc. and file management, etc. Meanwhile, in this embodiment, photo content data is recorded as compressed data using the JPEG (Joint Photographic Experts Group) system.

The Web content processing unit 60 is a functional block for displaying images of Web pages which were accessed through the communication I/F 14.

Figure 3:
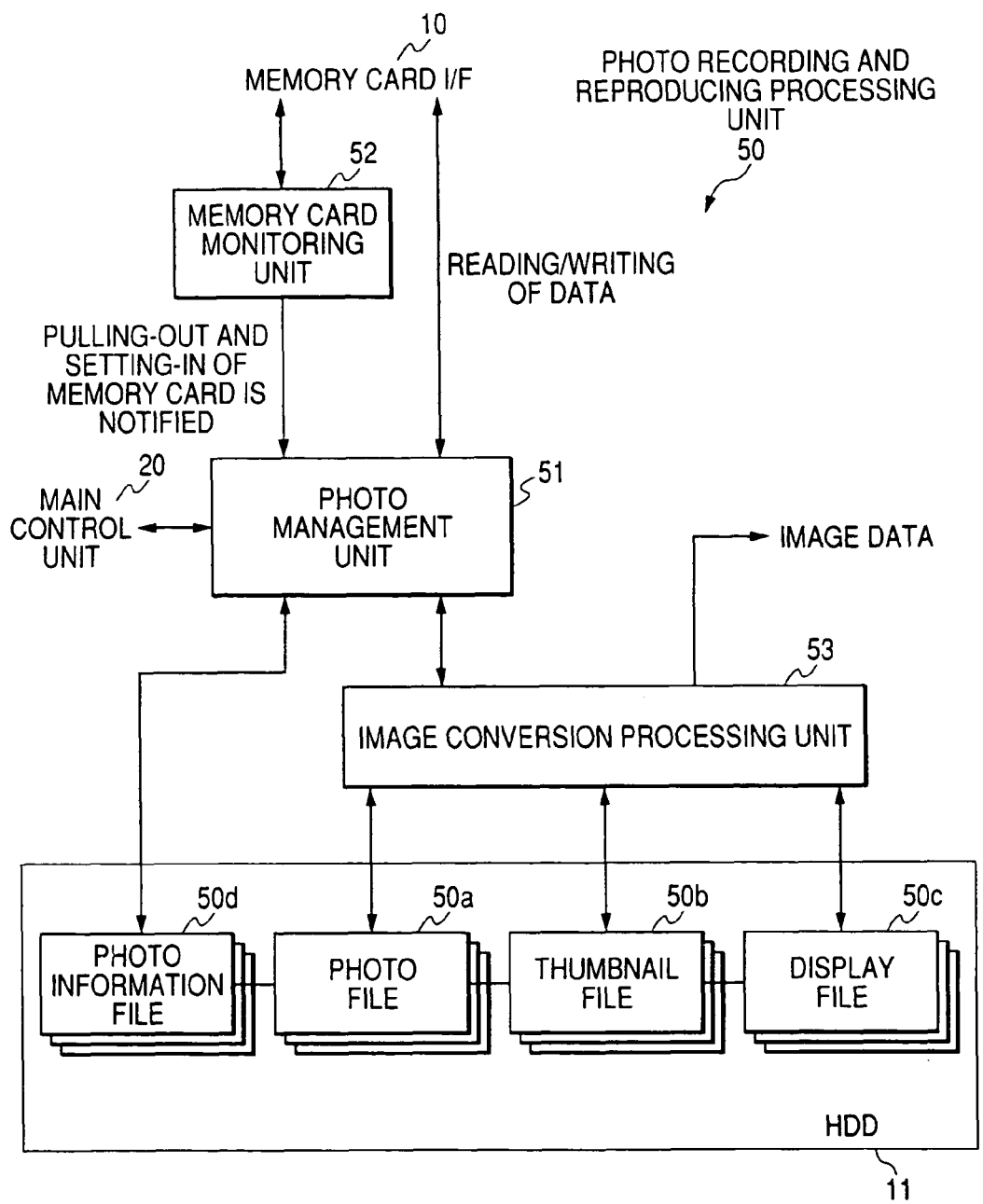
FIG. 3 is a block diagram which shows a more detailed functional configuration of a photo recording and reproducing processing unit.

FIG. 3 is a block diagram which shows a more detailed functional configuration of the photo recording and reproducing processing unit 50.

As shown in FIG. 3, the photo recording and reproducing processing unit 50 is equipped with a photo management unit 51 which manages a data file of photo content (hereinafter referred to as a photo file), a memory card monitoring unit 52 which monitors the presence or absence of a loaded memory card 10*a*, and an image conversion processing unit 53 which carries out processing such as data conversion of a photo file.

The photo management unit 51 controls the reading and writing of data, such as a photo file, in the memory card 10*a* and the HDD 11, in response to a request from the main control unit 20 and a notification from the memory card monitoring unit 52, the temporary saving of the stored data when the memory card 10*a* is loaded, data reading from HDD 11, slide show processing of photo files, history management of photo files in HDD 11, and so on.

The memory card monitoring unit 52 monitors whether the memory card 10*a* is loaded or not through the memory card I/F 10, and when the memory card 10*a* is pulled out or slid in, it notifies the photo management unit 51 of same.

The image conversion processing unit 53 carries out processing of a photo file, such as expansion decoding and resizing, format conversion, etc.

In the photo recording and reproducing processing unit 50, in order to realize high speed image drawing when displaying photo files recorded on the memory card 10*a* and the HDD 11 by a slide show, photo files which were stored in the memory card 10*a* are temporarily saved in the HDD 11 automatically when the memory card is loaded into the memory card I/F 10. Together with this, as shown in FIG. 3, for all of the photo files both a thumbnail file 50*b*, which is used when displaying the stored photo content as a list, and a display file 50*c*, which is optimized for use in displaying on a display, are generated in HDD 11, together with an original file 50*a*, and are saved in association with a photo information file 50*d* which is meta data of the photo file.

More particularly, when the memory card 10*a* is loaded, the photo management unit 51 receives a notification from the memory card monitoring unit 52, and then automatically reads photo files from the memory card 10*a* sequentially, generates the photo information file 50*d*, and saves it as a temporary file in HDD 11 together with the photo file 50*a*. Together with this, the image conversion processing unit 53 is requested to generate the thumbnail file 50*b* and the display file 50*c* of the photo file 50*a*.

The image conversion processing unit 53 applies expansion decoding processing to the photo file 50*a*, and further carries out resizing thereof, and generates the thumbnail file 50*b* and the display file 50*c* in a RAW format, and saves these files as temporary files in HDD 11 in association with the photo file 50*a*. Meanwhile, in the case of an NTSC system, the display file 50*c* is set to a pixel number of 720×480.

Then, when reproduction and output of photo files in the memory card 10*a* is requested by an input operation of a user, the photo management unit 51 reads out a temporary file which was saved in HDD 11, in response to a request from the main control unit 20, and outputs it to the image output processing circuit 5. As a result, the need to carry out expansion decoding processing, etc. when displaying images is eliminated, so that high-speed display becomes possible. In particular, when reproduction and output by a slide show is requested, image display is carried out with no stress to a user by sequentially reading out the display file 50*c* from HDD 11.

In addition, when there is a request to transfer a photo file in the memory card 10*a* and to record it in HDD 11, the pertinent temporary file which was already saved in HDD 11 is changed to a permanently recorded state by the processing of the photo management unit 51.

Further, when the memory card 10*a* is pulled out from the memory card I/F 10 while permanent recording of the recorded photo file to HDD 11 is not requested, the photo management unit 51 receives a notification thereof from the memory card monitoring unit 52, and erases the pertinent temporary file in HDD 11. In addition, it is also possible to omit useless processing by such processing that, without erasing the temporary file at this time, it is saved in a reproduction and output impossible state, and when the memory card 10*a* in which an identical photo file is recorded is loaded again later, reproduction and output, etc. are carried out by use of a temporary file in HDD 11, without carrying out data reading from the memory card 10*a*.

Figure 4:
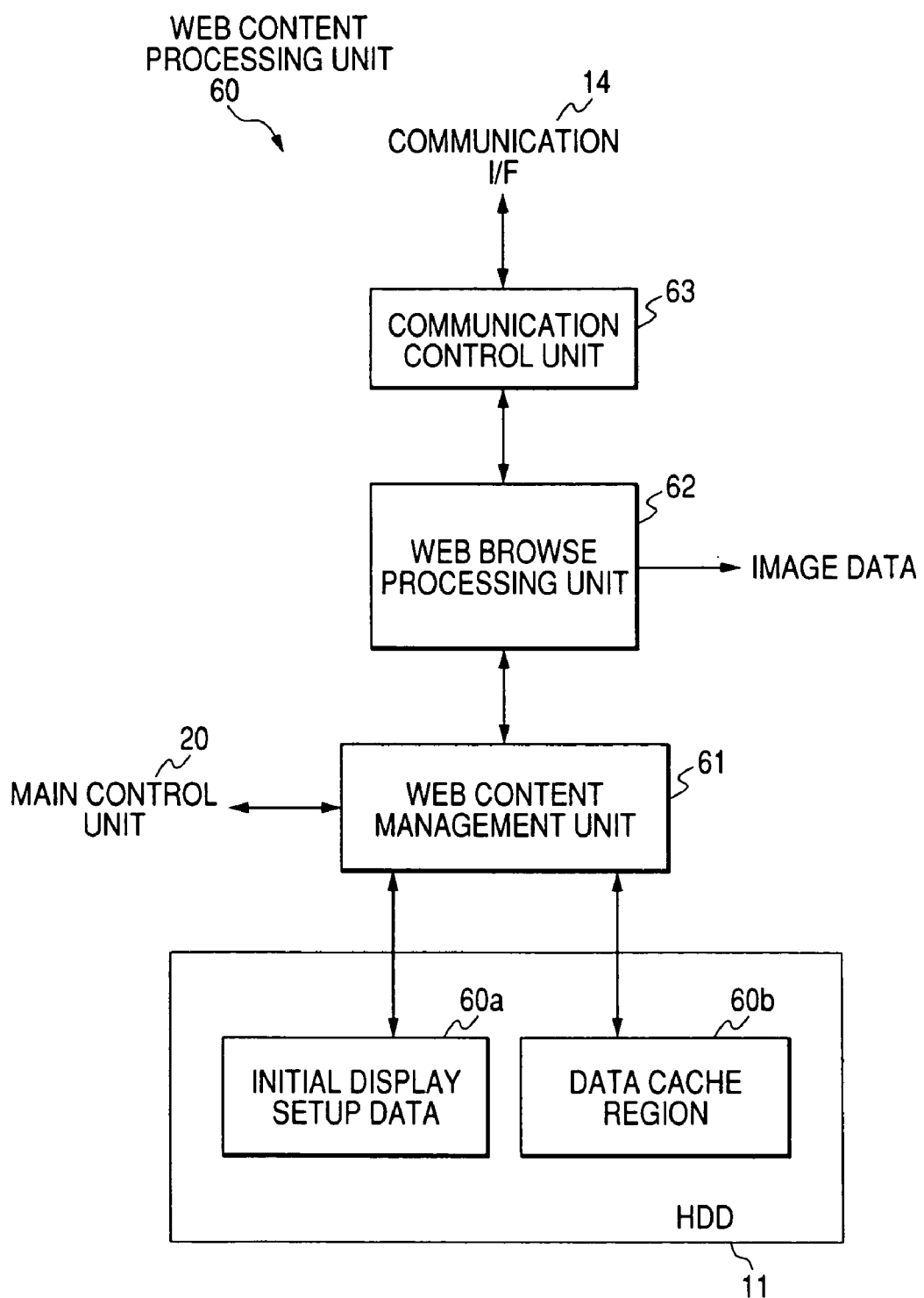
FIG. 4 is a block diagram which shows a more detailed functional configuration of a Web content processing unit.

Next, FIG. 4 is a block diagram which shows a more detailed functional configuration of the Web content processing unit 60.

As shown in FIG. 4, the Web content processing unit 60 is equipped with a Web content management unit 61 which carries out data management of Web content, a Web browse processing unit 62 which carries out browse processing of Web pages, and a communication control unit 63 which controls communication with an external Web server.

The Web content management unit 61 sets up initial display setup data 60*a* in HDD 11 in response to a request from the main control unit 20, and notifies the communication control unit 63 of the URL which was indicated in this initial display set up data 60*a* through the Web browse processing unit 62. The Web content management unit 61 also saves data of the received Web page as a history in a data cache region 60*b* in HDD 11, and refers to the data cache region 60*b* at the time of displaying Web content. In addition, in response to information from the main control unit 20, the Web content management unit 61 notifies the Web browse processing unit 62 of a selected position of a link anchor in a Web page which is now displayed.

The Web browse processing unit 62 analyzes HTML (Hyper Text Markup Language) data of Web pages which were received by the communication control unit 63, and generates image data and outputs it to the image output processing circuit 5. At this time, through the Web content management unit 61 and the main control unit 20, it requests that the image processing circuit 15 output data of predetermined GUI images. As a result, an image signal is output in which predetermined GUI images and images of Web page are combined.

In addition, the Web browse processing unit 62 receives selected position information of a link anchor from the Web content management unit 61, and then changes the highlighted position of the link anchor. Then, it notifies the URL which corresponds to that link anchor, first to the Web content management unit 61, and when data of a corresponding Web page is saved in the data cache region 60b, it receives this and generates and outputs image data of the Web page. In addition, when data of a corresponding Web page is not saved in the data cache region 60b, it notifies the communication control unit 63 of the URL and requests access. It then generates and outputs image data on the basis of the received Web page.

The communication control unit 63 receives a notification of the URL from the Web browse processing unit 62, generates the information necessary to access a corresponding Web server, and transmits the information on the Internet through the communication I/F 14. In addition, it extracts data of the Web page from information received through the communication I/F 14, and supplies the data to the Web browse processing unit 62.

Here, when displaying Web content, a user can register a plurality of Web pages to be displayed as an initial screen. Hereinafter, the Web pages registered in this manner are referred to as initial display pages. URLs of these initial display pages are registered as initial display setup data 60a, and at the time of displaying Web content, it is possible to select an arbitrary URL from the initial display setup data 60a and display a Web page thereof. Then, it is possible to select a link anchor in the displayed Web page, and to further display another Web page. In addition, at the time of displaying Web content, with regard to Web pages which are cache-stored in the data cache region 60b, it is possible to display them without newly accessing the corresponding Web pages.

Further, it is also possible to carry the automatic link which automatically selects a predetermined link anchor in a Web page, beginning at a registered initial display page as a starting point, by control of the Web content management unit 61, and to display Web pages one after another. At the time of execution of the automatic link, Web pages are continuously displayed at predetermined time intervals, and it is also possible to automatically change screens which are displayed with reference to a history in a backward direction.

Figure 5:
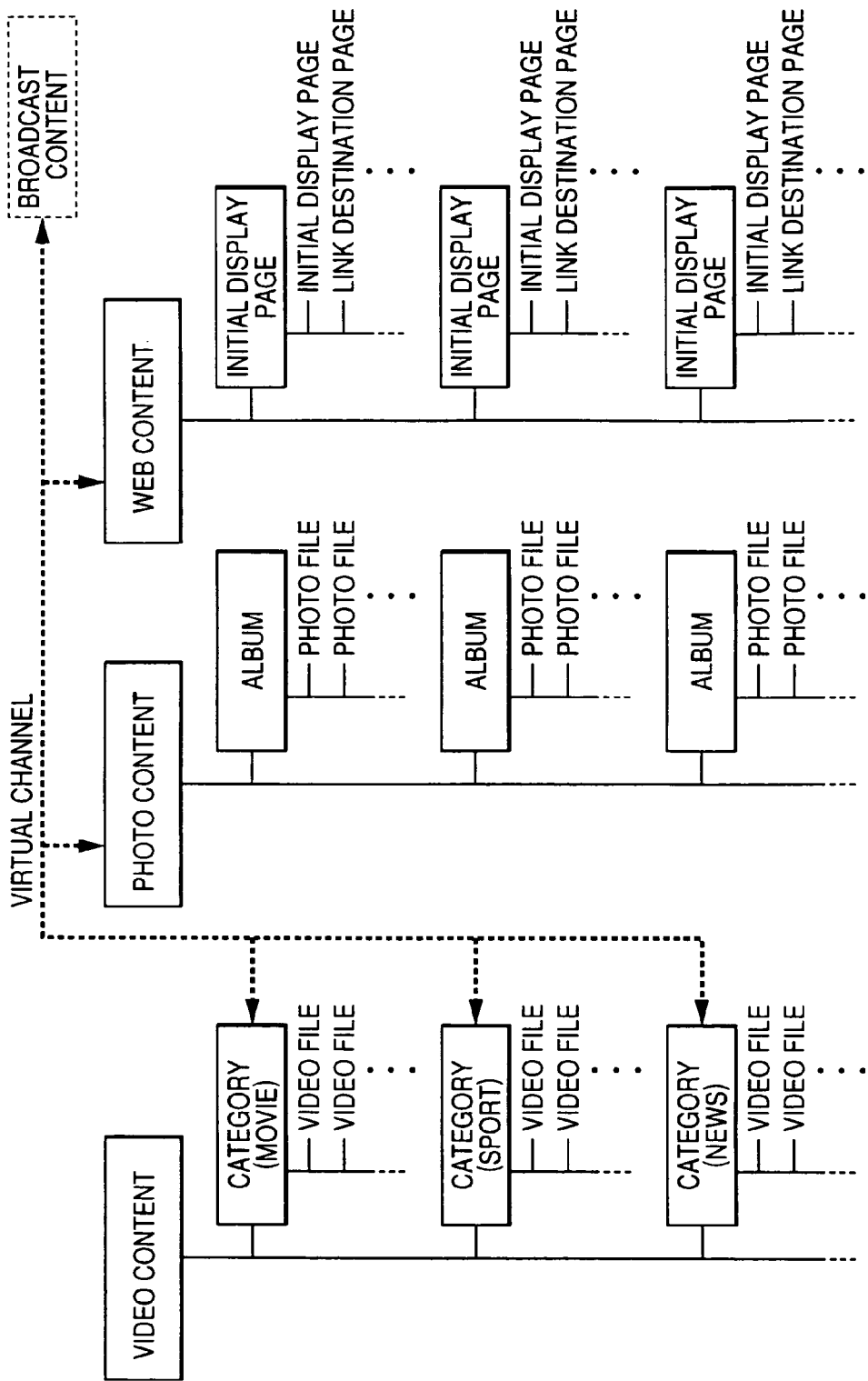
FIG. 5 is a view which schematically explains a method of file management for video content, photo content and Web content.

Next, FIG. 5 is a view for schematically explaining a method of file management for video content, photo content and Web content. The management of each content is carried out by control of the video recording and reproducing processing unit 40, the photo recording and reproducing processing unit 50 and the Web content processing unit 60, respectively.

Firstly, as shown in FIG. 5, the data files which form video content (inscribed as video files in FIG. 5) are managed by category. The category shows a genre to which that video content belongs, and is classified into, for example, movie, sport, news, drama, animation, etc. The classification by category may be carried out by automatically determining the category from additional information, etc. of the broadcast content, for example, at the time of recording the received broadcast content on the HDD 11 and the optical disk medium 12a. In addition, the classification may also be carried out in response to an operation of a user.

The data files (photo files) which form photo content are managed by albums which are comparable to folders. The classification by albums can be carried out arbitrarily by an operation of a user. In this regard, however, basically, photo files in the memory card 10a and photo files permanently recorded in HDD 11 are to be managed under different albums.

By such classification, an arbitrary album is selected at the time of displaying photo content, and thereby, it is possible to realize a slide show by displaying photo files in that album in sequence at predetermined time intervals. That is, it is possible to carry out a slide show for each album.

For example, at the time of normal execution of a slide show, corresponding display files 50c may be read out in sequence at 10 second intervals, starting with the photo file at the beginning of an album, reproduced and displayed. In addition, it is also possible to carry out operations which are comparable to fast-forward and slow reproduction, rewind, etc. in moving image content by adjusting the time interval and direction of the reading out.

The data files which form the Web content are stored by initial display page which was set up in the initial display setup data 60a in the data cache region 60b in the HDD 11, as Web pages are displayed one after another. For example, folders are generated by initial display page, and data files of a Web page as a link destination, which was linked to a starting point of the initial display page, are stored sequentially in each folder following the data file of the initial display page which becomes the starting point.

Here, the reason that management is carried out according to the initial display page is that an automatic link is carried out according to the initial display page. That is, the automatic link is carried out beginning at an initial display page, which was arbitrarily selected among registered ones, as a starting point. Therefore, it is possible to readily display, in the backward order, Web pages which were already displayed, using the classification as in FIG. 5. As a result, it is possible to carry out an operation which is comparable to fast-forward and slow reproduction, rewind, etc. in moving image content, by adjusting the time interval and direction for automatically changing screens.

Meanwhile, each data of an initial display page and a Web page as a link destination under the same is generated in the data cache region 60b in HDD 11 as a temporary file at the time Web content is displayed, and those temporary files are erased, for example, at such time that another virtual channel is selected, or a power source is cut off. Alternatively, data files of Web pages in the data cache region 60b may be kept even after the above-described time, and as a result, it is possible to carry out the automatic link in the order of links which were stored in the data cache region 60b when the same initial display page is selected after that.

In the meantime, in the above-described image recording and reproducing apparatus, in order to display broadcast content, video content, photo content and Web content as described above, the concept of a virtual channel is used. The virtual channel is, as shown in FIG. 5, allocated to each category in the broadcast content and the video content, the photo content, and the Web content. As a result, with regard to non-moving image content such as the photo content and the Web content, it is possible to select the content in the same breadth as content using moving images, such as the broadcast content, without carrying out a complicated menu operation as in the past.

Figure 6:
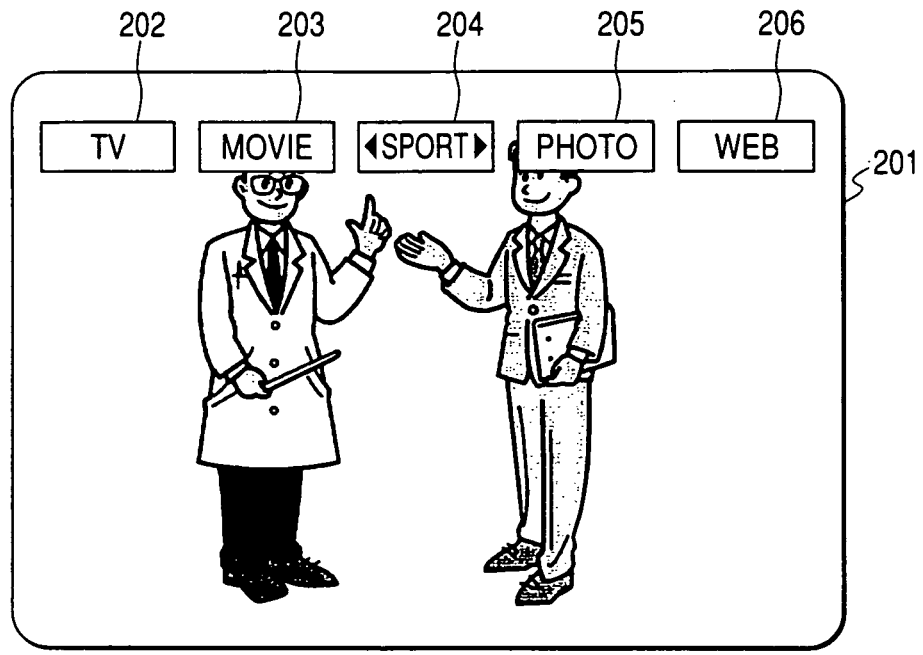
FIG. 6 is a view which shows an example of a display screen for selecting a virtual channel.

FIG. 6 is a view which shows an example of a display screen for selecting the virtual channel.

In the screen display example of FIG. 6, selection sections 202~206 for selecting the virtual channel are OSD-displayed on a display section 201 of a content. In FIG. 6, as an example, in the selection section 202, it is possible to select broadcast content (inscribed as "TV" in the figure), and as categories of video content, it is possible in the selection sections 203 and 204 to select "movie", "sport", respectively. In addition, it is possible in the selection section 205 to select photo content, and it is possible in the selection section 206 to select Web content.

It is possible to select each selection section 202~206 by changing a highlighted position by an operation of a user. In FIG. 6, as an example, the selection section 204 which shows a category of "sport" is highlighted, and by carrying out an acceptance operation after this, the reproduction of video content under the category of sport is started. In the same manner, by selecting and accepting the selection section 205 which shows photo content, a slide show is started from the first photo file of a predetermined album. Alternatively, a list of albums may be displayed in response to selection of the selection section 205, and an arbitrary album and a photo file in the album may be separately selected. Further, by selecting and accepting the selection section 206 which shows Web content, the automatic link is started, beginning at a predetermined initial display page as a starting point.

In this manner, by allocating photo content and Web content to a virtual channel which is of the same breadth as broadcast content and video content, it is possible for a user to select each type of content by the same operation. Therefore, the need to carry out a specific operation and a complicated operation using a menu screen, etc. on the occasion of selecting photo content and Web content is eliminated, so that operability by a user is heightened.

In addition, by automatically starting continuous reproduction (slide show and automatic link) of each content without carrying out an explicit starting operation when photo content and Web content are selected as the virtual channel, it is possible for a user to browse still image content with the same feeling as at the time of reproduction of broadcast content and video content.

Figure 7:
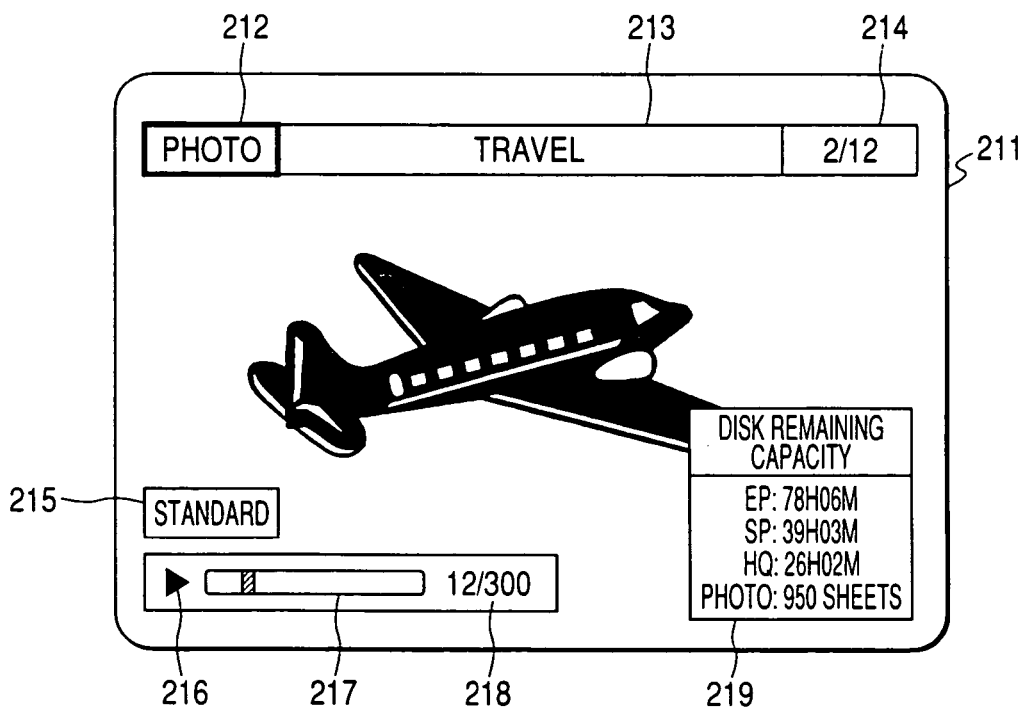
FIG. 7 is a view which shows an example of a display screen at the time of carrying out a slide show of photo content.

FIG. 7 is a view which shows an example of a display screen at the time of carrying out a slide show of photo content.

The screen shown in FIG. 7 is a screen of a slide show which is changed from the screen shown in FIG. 6 when the selection section 205 which shows photo content is selected. In the screen of FIG. 7, an image of photo content is displayed on a display section 211, and it is possible to combine and display OSD images which show various information as follows in response to a user operation.

A display section 212 indicates that photo content is now selected as the virtual channel, and a display section 213 displays the title of the album which is now selected. In addition, a display section 214 displays the number of albums of photo content which are stored in the loaded memory card 10a and the HDD 11, and the number of the album which is now selected.

In addition, a display section 215 indicates the display speed of the slide show, and shows, in the example of FIG. 7, that it is a standard speed. In addition, an icon 216 shows the operating state of the slide show which is now being carried out, and shows, in the example of FIG. 7, a period of reproduction with a normal speed in a forward direction. In addition, a slide bar 217 shows the position in the stored album of the photo file which is now being displayed, and a display section 218 shows the number of photo files in the selected album, and the number of the photo file which is now being displayed. The number of the photo file being displayed changes in conjunction with the slide bar 217.

In addition, a display section 219 displays the remaining capacity of HDD 11 as the recording time of video content and the number of photo files.

Figure 8:
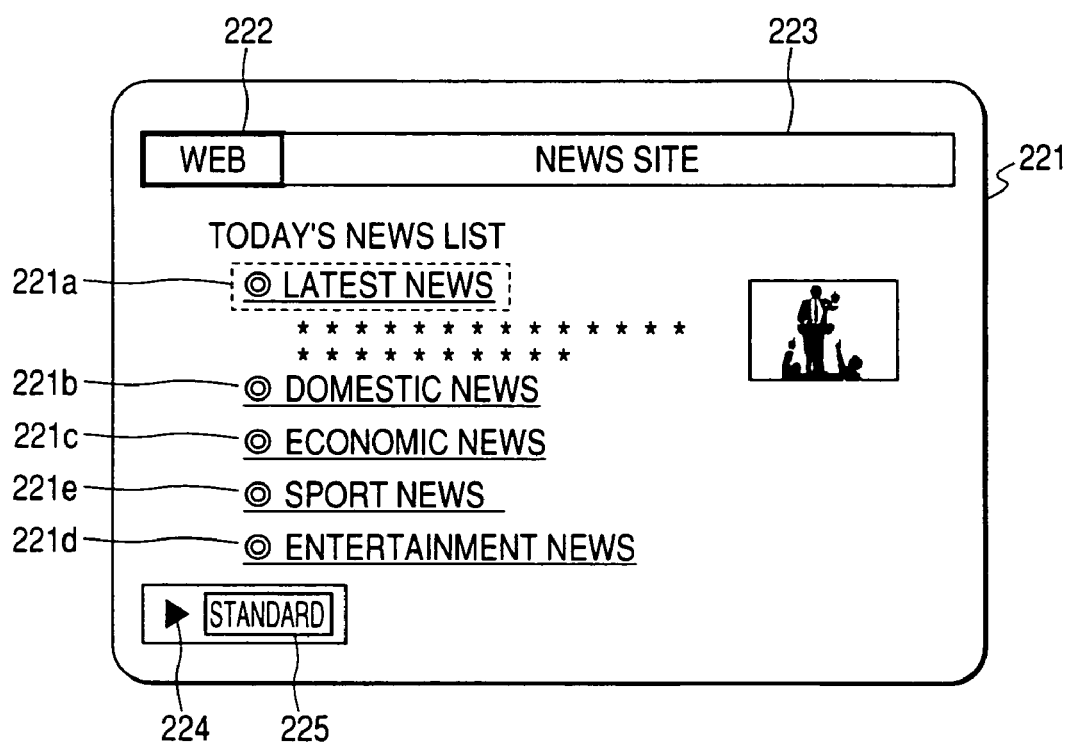
FIG. 8 is a view which shows an example of a display screen at the time of carrying out automatic link of Web content.

FIG. 8 is a view which shows an example of a display screen at the time of executing an automatic link of Web content.

The screen shown in FIG. 8 is a screen of a Web page which is changed from the screen shown in FIG. 6 when the selection section 206 which shows Web content is selected. In the screen of FIG. 8, a display section 221 displays an image of a Web page, and combines and displays OSD images which show various information as follows.

A display section 222 indicates that Web content is now selected as the virtual channel, and a display section 223 displays the title of a Web page which is now being displayed. In addition, an icon 224 shows the operating state of the automatic link which is now being carried out, and shows, in the example of FIG. 8, that it is in a period of reproduction in a forward direction. In addition, a display section 225 indicates the display speed of the automatic link, and shows, in the example of FIG. 8, that it is a standard speed.

In the meantime, a plurality of link anchors 221a~221e for linking to other Web pages are displayed on an image of the Web page in the display section 221. In addition, in the example of FIG. 8, the link anchor 221a is highlighted, and when an acceptance operation is carried out by a user, it is possible to display the next Web page by accessing the URL which corresponds to this link anchor 221a.

In the automatic link, by deciding the initial position of the link anchor to be highlighted, Web pages are continuously linked and displayed, without carrying out position designation of link anchors by user operations. It is possible to set up the initial position of the link anchor, for example, with reference to "tabindex attribute" which is described in HTML data of a Web page.

The "tabindex attribute" is, for example, an attribute for designating the order of link anchors when changing the highlight position to a link anchor on a Web page in sequence by use of a TAB key, etc. on a keyboard of a PC, and it is possible to change the highlight position in sequence from a link anchor with a small numerical value through the use of the TAB key by allocating an arbitrary numerical value in a range of 0-32767 in the case of HTML-ver4.0.

Therefore, for example, by setting the link anchor with the smallest numerical value of "tabindex attribute" as the initial highlight position at the time of automatic link execution, it is possible to automatically display the next Web page. As a result, it is possible to browse Web content, which is static content, by the same operation as in moving image content, and it is possible for a user to browse Web content through the use of a television receiver without having a significant uncomfortable feeling.

In addition, if a user wants to select a link anchor other than the one at the initial highlighted position, the highlighted position can be changed in the order corresponding to a small numerical value of "tabindex attribute" by an operation, etc. of a cursor key, and after that, the link anchor to which the "tabindex attribute" is not allocated is further targeted for selection.

Next, the operations of a user at the time of reproducing photo content and Web content will be described. The selection and display of each of the above-described content, and the input operations of a user for executing a state change, etc. are mainly carried out by use of a remote controller 100 which utilizes infrared communication, etc.

Figure 9:
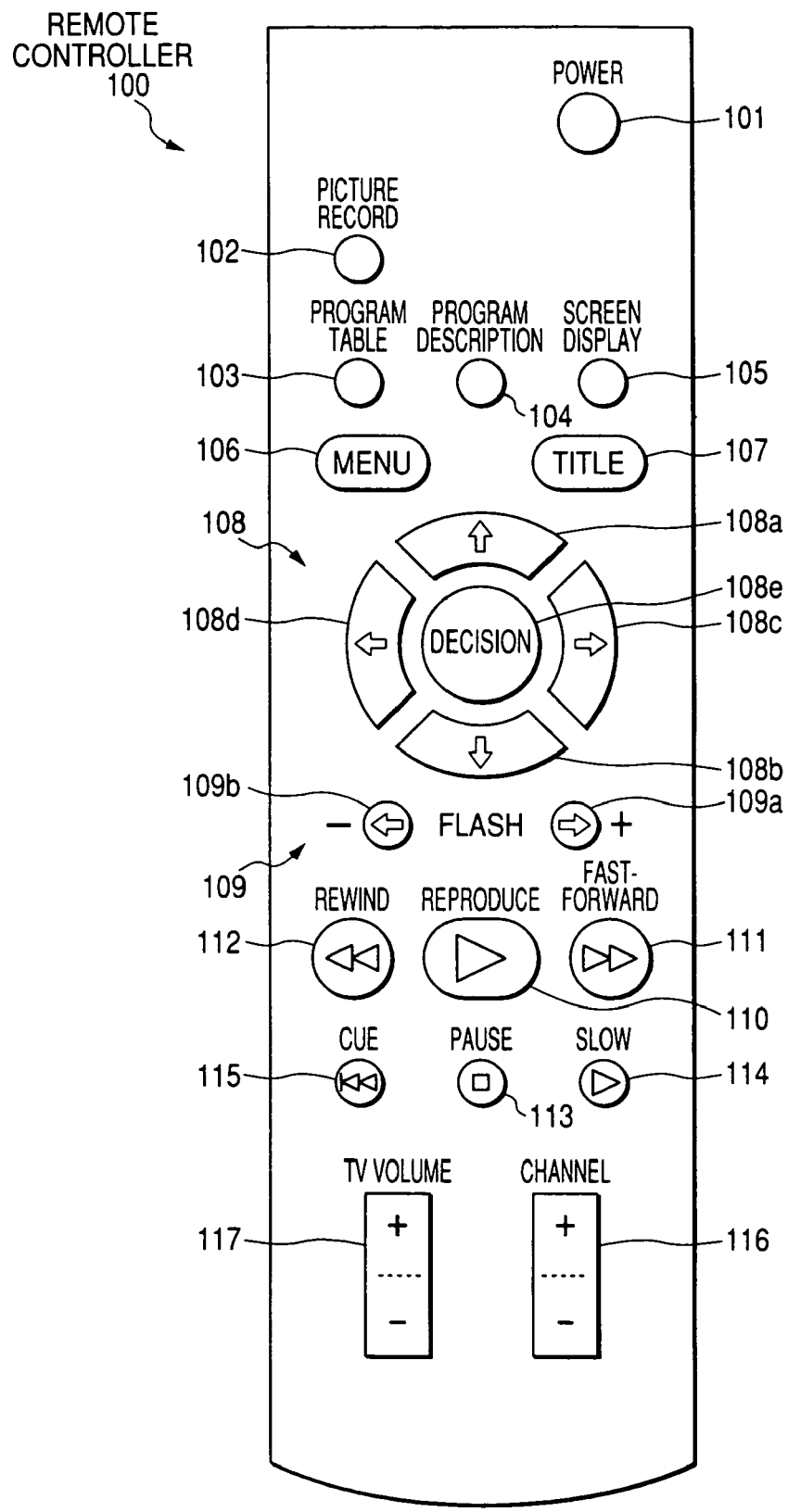
FIG. 9 is a view which shows the outer appearance of a remote controller.

FIG. 9 is a view which shows the outer appearance of the remote controller 100.

The remote controller 100 shown in FIG. 9 is equipped with a power key 101, a picture recording key 102, a program table key 103, a program description key 104, an image display key 105, a menu key 106, a title key 107, a cursor key 108, a flash key 109, a reproduction key 110, a fast-forward key 111, a rewind key 112, a pause key 113, a slow key 114, a cue key 115, a channel key 116, and a television volume key 117.

The power key 101 is a key for instructing a power source of an image recording and reproducing apparatus to turn on or off. The picture recording key 102 is a key for recording broadcast content which is currently being received onto a recording medium. The program table key 103, the program description key 104 and the screen display key 105 are keys for displaying various information regarding the content which is currently being displayed.

The menu key 106 is a key for displaying a menu screen, and can display, for example, a screen for switching operating modes, which will be described later, and so on. The title key 107 is a key for displaying a list of titles for confirming the content recorded on a recording medium.

The cursor key 108 is equipped with up/down keys 108*a* and 108*b*, right/left keys 108*c* and 108*d*, and a decision key 108*e*, and is a key for carrying out, for example, shifting and acceptance, etc. of a cursor on a menu screen.

The flash key 109, the reproduction key 110, the fast-forward key 111, the rewind key 112, the pause key 113, the slow key 114 and the cue key 115 are keys for carrying out operations regarding the reproduction of content. Meanwhile, the flash key 109 is composed of operation keys 109*a* and 109*b* which designate forward direction and backward direction operations, respectively.

The channel key 116 is a key for selecting channels of television broadcasts which are mainly received. The television volume key 117 is a key for adjusting the volume of sound which is output from a speaker and a earphone, etc.

In this manner, the remote controller 100 includes operation keys which are mainly specialized for picture recording and reproduction of broadcast content and video content in the same manner as those used in a conventional image recording and reproducing apparatus. In the above-described image recording and reproducing apparatus, an operation of continuous reproduction of still image content (more particularly, a slide show of photo content and an automatic link of Web content) is also realized by use of these operation keys, and thereby, these operations are enabled by the same feeling as in the past. The allocation of the operation keys at the time of selection of each content is switched by the processing of the main control part 20 in accordance with the input conversion table 21.

Here, an example of the content of the input conversion table 21 is shown in a Table 1.

TABLE 1

|  | Video Content | Photo Content | Web Content |
| --- | --- | --- | --- |
| Up/down key | File switching in a category | Album switching | Initial display page switching |
| Left/right key | — | — | Highlighted position change |
| Channel key | File switching in a category | Album switching | Initial display page switching |
| Reproduction key | Video reproduction | Slide show start (10 seconds) | Automatic link start (30 seconds) |
| Fast-forward key | Video fast-forward | Slide show speed change (forward direction, 6 seconds → 3 seconds → 1 second) | Automatic link speed change (forward direction, 10 seconds → 6 seconds) |
| Rewind key | Video rewind | Slide show speed change (backward direction, 6 seconds → 3 seconds → 1 second) | Automatic link speed change (backward direction, 10 seconds → 6 seconds) |
| Pause key | Video pause | Slide show pause | Automatic link pause |
| Slow key | Video slow reproduction | Slide show speed change (30 seconds) | Automatic link speed change (60 seconds) |
| Cure key | Reproduction from the beginning of a file | Display a photo at the beginning of an album | Display of an initial display page |
| Flash key | Fast-forward/rewind for 15 seconds | Display of before and after photos | Jump to a highlighted link destination or a previous page |
| Program table key | File list display | Album list display | Initial display page list display |
| Program description key | Display of additional information | Display of information regarding photos | — |
| Screen display key | Display of information regarding a reproducing operation | Display of a current position of a slide show | — |

When the category of video content is selected from a selection screen of the above-described virtual channel shown in FIG. 6, reproduction of the first video content in the selected category is started by the processing of the video recording and reproducing processing unit 40. At this time, as shown in Table 1, the switching of video files in the selected category may be carried out by the up/down keys 108a and 108b. In addition, video files in the category may be switched in the same manner by the channel key 116. That is, it is possible to select an arbitrary video file in the category and to start reproduction from its beginning (or a place where reproduction was stopped last time) using these keys.

In addition, reproduction of a video file may be started by the reproduction key 110, and fast-forward and rewind of the video file may be carried out by the fast-forward key 111 and the rewind key 112, respectively. Also, reproduction may be paused by the pause key 113, thereby causing the screen to freeze. Additionally, the reproduction speed may be lowered by the slow key 114, and a video file currently being reproduced may be returned to its beginning and reproduction may be started again by the cue key 115.

In addition, by operation keys 109a and 109b of the flash key 109, skip reproductions in a forward direction and in a backward direction (e.g., fast-forward and rewind only for 15 seconds) may be carried out. In order to confirm or select a video file in the selected category by the program table key 103, its file name, etc. are displayed as a list. In addition, by the program description key 104, additional information of a video file currently being reproduced may be displayed, and by the screen display key 105, information regarding the reproducing operation, such as the elapsed time of the video file currently being reproduced, may be displayed.

In contrast to this, when photo content is selected, a slide show is started by the processing of the photo recording and reproducing processing unit 50, and photo files in a predetermined album are reproduced and output one after another. At this time, by the up/down keys 108a and 108b, switching of albums recorded on the memory card 10a or the HDD 11 may be carried out. In addition, albums may be switched by the channel key 116 in the same manner. A slide show may be started beginning at the first photo content of the selected album as the starting point. In this manner, it is possible to switch the recorded album by the same operation as that for switching broadcast channels when viewing and listening to broadcast content in the past, i.e., by the up/down keys 108a and 108b and the channel key 116.

In addition, by the reproduction key 110, the slide show may be started, for example, at the time of pause. At this time, the image display of the slide show is carried out at a normal speed (10 second interval).

In addition, by the fast-forward key 111 and the rewind key 112, the display interval of the slide show may be shortened. For example, the display interval in the forward direction may be changed by the fast-forward key 111, and every time this key is depressed, the display interval may be changed in the manner of 6 seconds, 3 seconds, 1 second. In addition, the reproduction direction may be reversed by the rewind key 112, and the display interval may be changed in sequence in accordance with the number of depressions in the same manner as described above.

In addition, a slide show may be paused by the pause key 113, and the image of the photo file which was displayed at that time point will be continuously displayed. Further, the display interval of the slide show may be changed to 30 seconds by the slow key 114, and the display speed will be lowered. In addition, a photo file may be returned to the first photo file in the currently selected album by the cue key 115, and the slide show may be started again. In addition, the immediately preceding and immediately following photo files in the album may be displayed, respectively, by the operation keys 109a and 109b of the flash key 109.

In this manner, in a slide show, images are continuously reproduced, but also various operations may be carried out, and the operations for controlling these are set up so as to be close in sensory perception to the reproducing operation of video content. Therefore, a user who is familiar with operations to reproduce video content can browse photo content without a significantly uncomfortable feeling in the operations.

In addition, it is possible to display various information regarding photo content as OSD images by further using the program table key 103, the program description key 104 and the screen display key 105. For example, by the program table key 103, album names, etc. of the albums recorded on the memory card 10a and the HDD 11 are displayed as a list, and by the program description key 104, display/non-display of information regarding a currently displayed photo file, such as the data quantity and shooting data of the photo file, are switched, and by the screen display key 105, display/non-display of information (e.g., corresponds to the slide bar 217 and the display section 218 of FIG. 7) which shows the position of the currently displayed photo file in the selected album are switched.

In addition, when Web content is selected, automatic link is started by the processing of the Web content processing unit 60. In the automatic link, a link anchor in a Web page is automatically selected so as to jump to its link destination, and it is also possible to jump to a link destination by highlighting another link anchor in the Web page by an operation of the remote controller 100.

At the time of carrying out the automatic link, switching of an initial display page to be displayed may be carried out by the up/down keys 108a and 108b. In addition, the initial display page may be switched by the channel key 116 in the same manner. At this time, the switched initial display page is displayed and the automatic link is started, beginning at this initial display page as a starting point. In this manner, it is possible to change the initial display page by the up/down keys 108a and 108b and the channel key 116 by the same operation as that for switching broadcast channels when viewing and listening to broadcast content in the past.

In addition, the highlighted position to a link anchor in a currently displayed Web page may be changed by the left/right keys 108c and 108d. When the left/right keys 108c and 108d are depressed, the system may be configured so that, for example, the time before jumping to a next Web page is stopped for approximately several seconds, and there is no jump to a next Web page which is not intended while searching for a link destination.

In addition, the automatic link may be started by the reproduction key 110, for example, during a pause. At this time, the image display interval before jumping to the next Web page is set to 30 seconds as a normal interval.

In addition, the display interval of the automatic link may be shortened by the fast-forward key 111 and the rewind key 112. For example, the display interval in the forward direction to the next Web page may be changed by the fast-forward key 111, and every time this key is depressed, the display interval may be changed in a manner of 10 seconds, 6 seconds (if it is further depressed, it returns to 10 seconds). In addition, the link direction may be reversed by the rewind key 112 so that an immediately preceding Web page may be displayed sequentially, and the display interval may be changed sequentially in accordance with the number of depressions in the same manner as described above.

In addition, the automatic link may be paused by the pause key 113, and the image of a Web page which was displayed at that time point is continuously displayed. Further, the display interval of the automatic link may be changed to 60 seconds by the slow key 114 so that the display speed is lowered. Also, the cue key 115 returns to the initial display page which was the starting point at that time, and automatic link may be started again in an order corresponding to the changes which occurred until then. In addition, use of the operation key 109*a* of the flash key 109 causes a forced jump to the link destination which corresponds to a link anchor highlighted in a currently displayed Web page so that the next Web page is displayed. In addition, by the operation key 109*b*, an immediately preceding Web page may be displayed.

In this manner, even in the automatic link, Web pages may be automatically displayed continuously, and in addition, it is possible to carry out various operations, and the operations for controlling these are set up so as to be close in sensory perception to the reproducing operation of video content. Therefore, a user who is familiar with operations to reproduce video content can browse Web content without a significantly uncomfortable feeling in the operations.

As with photo content, it is possible to display a list of site names and authors, the URLs of initial display pages which have been registered, etc. through the use of program table key 103.

Next, the processing in the image recording and reproducing apparatus when executing a slide show of photo content and automatic link of Web content will be described in detail.

Figure 10:
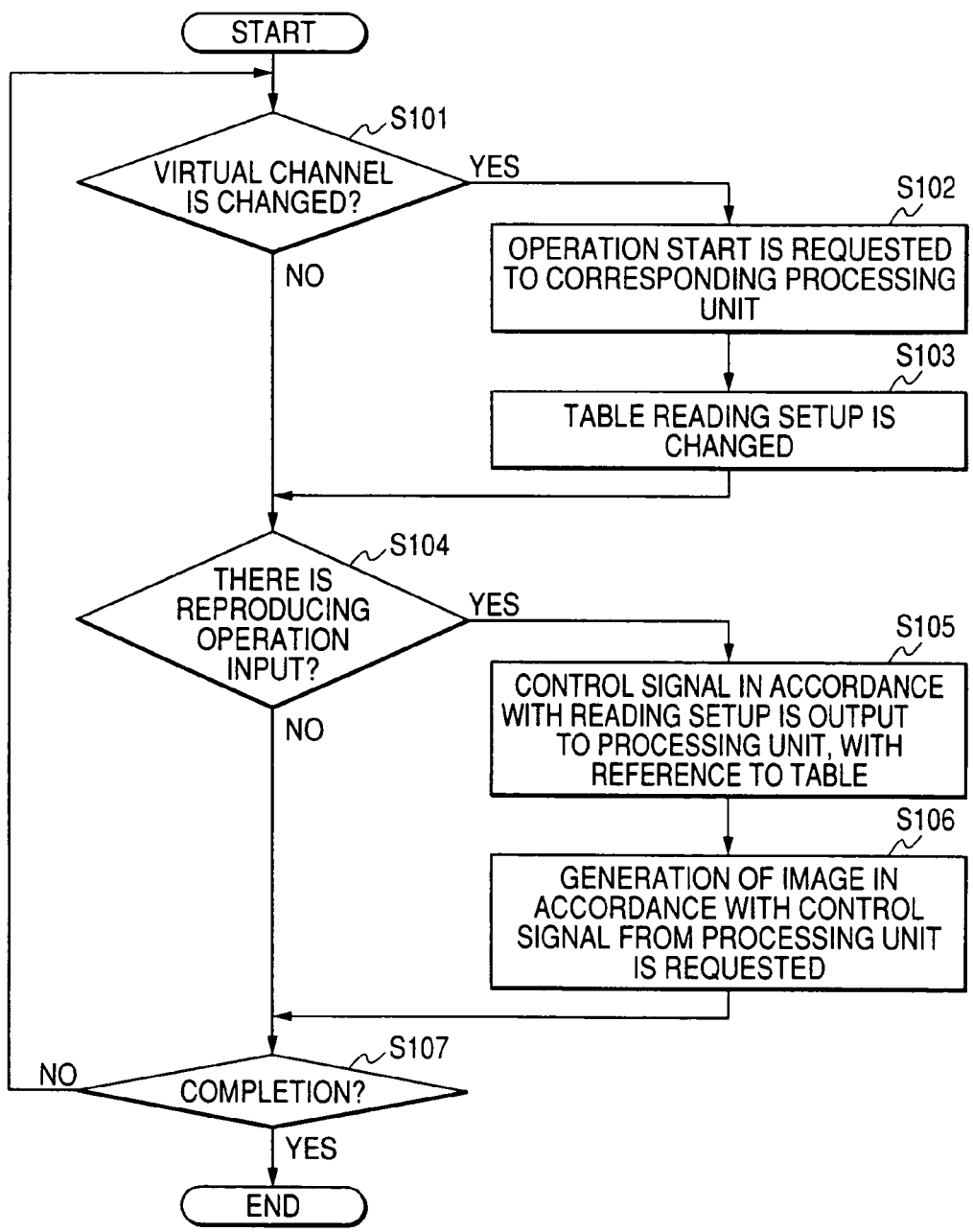
FIG. 10 is a flow chart which shows the processing in a main control unit at the time of reproducing content.

Firstly, FIG. 10 is a flow chart which shows the processing in the main control unit 20 at the time of reproducing content.

When content is reproduced, the main control unit 20 continually monitors for the presence or absence of an operation to change the virtual channel (corresponds to step S101), and the presence or absence of an input for a reproducing operation (step S104) on the basis of an input signal from the input I/F 13.

In step S101, when an input to change the virtual channel is received from the remote controller 100 through the input I/F 13, the process goes to step S102. If such an input is not received, it goes to step S104.

In step S102, the start of an operation to reproduce content is requested to a processing unit which corresponds to the changed virtual channel. For example, when a category of video content is selected, the reproduction of video data in the category is requested to the video recording and reproducing processing unit 40.

In addition, when photo content is selected, the start of a slide show using photo files in a predetermined album is requested to the photo recording and reproducing processing unit 50. Further, when Web content is selected, the start of automatic link beginning at a predetermined initial display page as a start point is requested.

In step S103, the setup of content which is an object to be read out when referring to the input conversion table 21 is changed in accordance with the selected virtual channel. After this, the process goes to step S104.

In step S104, when the input of a reproducing operation is received, the process goes to step S105. If such input is not received, the process goes to step S107.

In step S105, on the basis of information which corresponds to the content which was set up as the object to be read out with reference to the input conversion table 21, a control signal which corresponds to the signal input from the input I/F 13 in step S104 is output to the currently working processing unit (e.g., the video recording and reproducing processing unit 40, the photo recording and reproducing processing unit 50, or the Web content processing unit 60, etc.). As a result, a reproducing operation corresponding to the input operation is carried out in the approximate processing unit.

In step S106, when the processing unit requests that the OSD images on a screen be changed, along with the reproducing operation which was carried out in accordance with the control signal output in step S105, the generation and output of an OSD image which corresponds to this request is requested to the image processing circuit 15. As a result, the display information on the OSD image changes in accordance with the executed reproducing operation. After this, the process goes to step S107.

In step S107, it is determined whether the termination of the reproducing operation has been requested, for example, by depressing the power key 101, and only when termination has not been requested does the process return to step S101 and processing continue.

Figure 11:
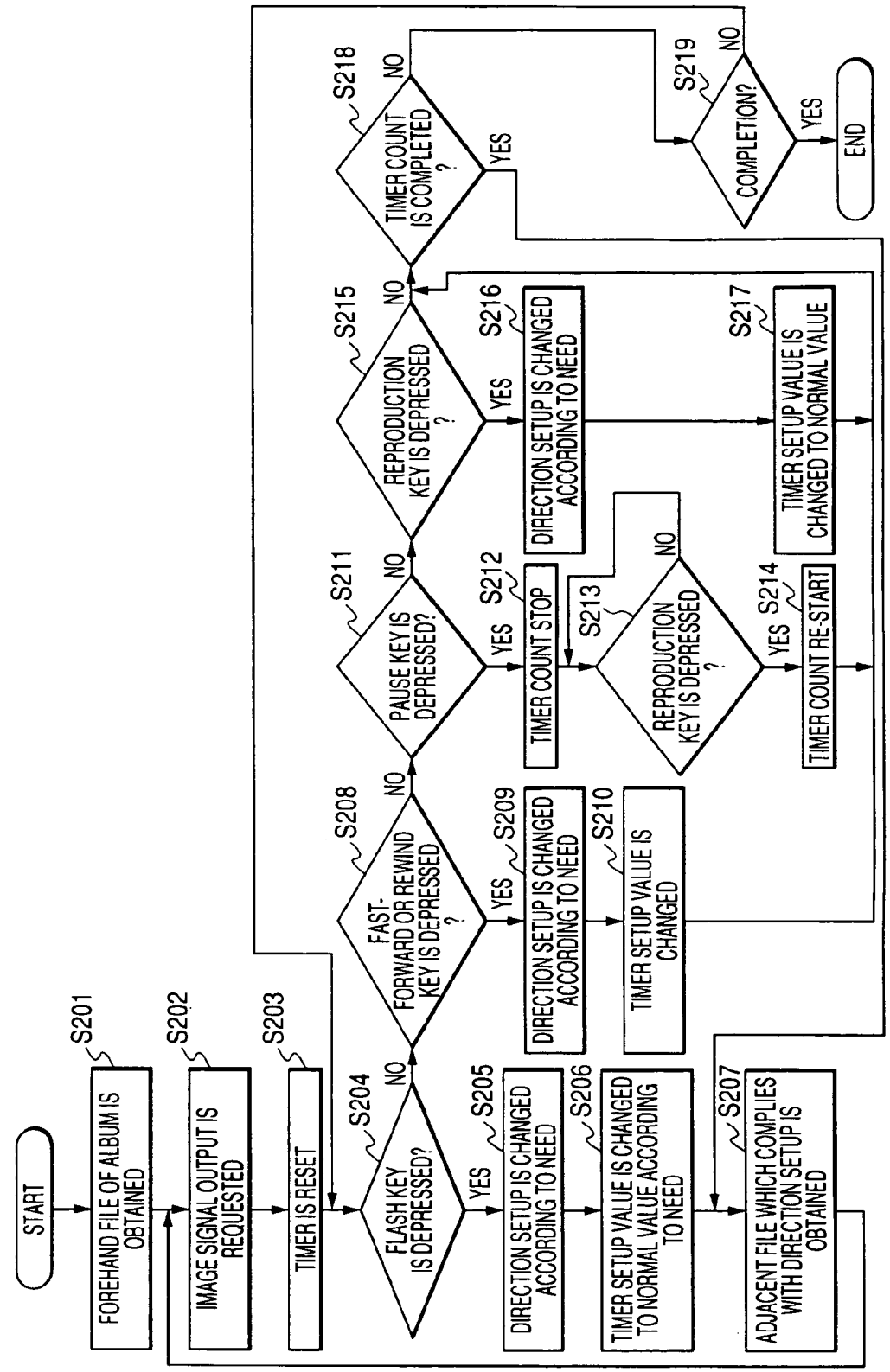
FIG. 11 is a flow chart which shows the processing in a photo recording and reproducing processing unit in the case that photo content is selected as the virtual channel.

Next, FIG. 11 is a flow chart which shows the processing in the photo recording and reproducing processing unit 50 when photo content is selected as the virtual channel.

In step S201, the first photo file in a predetermined album (in practice, display file 50*c* which was associated with this photo file) is obtained from the HDD 11. An album which is selected at this time is referred to as, for example, an album for which a slide show was carried out for the last time before then.

In step S202, the obtained photo file is output to the image output processing circuit 5 to request the output of an image signal.

In step S203, the count value of a timer for obtaining the image display time is reset.

In step S204, if the depression of the flash key 109 is detected, the process goes to the a step S205, and if not, it goes to a step S208.

In step S205, in accordance with the type of the operation key (operation keys 109*a* or 109*b*) depressed in step S204, the setup of the display direction of images is changed if necessary. For example, if the operation key 109*b* for requesting display of an adjacent file in the backward direction is depressed when the setup is the forward direction, the direction is changed to the backward direction. Conversely, if the operation key 109*a* for requesting display of an adjacent file in the forward direction is depressed when the setup is the backward direction, the direction is changed to the forward direction.

In step S206, if the setup value for terminating the count of the timer is not 10 seconds, which is the normal value, that setup value may be changed to the normal value.

In step S207, the adjacent photo file (display file 50*c*) in the setup direction is obtained from HDD 11, and the process returns to step S202. By the processing of the above-described steps S202 and S204~S207, it is possible to reproduce and output the immediately preceding or the immediately following photo file in an album in accordance with a user operation.

In addition, in step S208, if the depression of the fast-forward key 111 or the rewind key 112 is detected, the process goes to step S209, and if not, it goes to step S211.

In step S209, the direction setup is changed according to need. That is, if the rewind key 112 is depressed when displaying in the forward direction, or if the fast-forward key 111 is depressed when displaying in the backward direction, the direction setup is changed.

In step S210, the timer setup value is changed. At this time, every time each key is depressed one time (i.e., every time step S210 is carried out as to each key), the timer setup value is changed in the order of 6 seconds, 3 seconds, and 1 second. As a result, the timer setup value is changed to an interval which is shorter than the normal value. After this, the process goes to step S218.

In addition, in step S211, if the depression of the pause key 113 is detected, the process goes to step S212, and if not, it goes to step S215.

In step S212, the count operation of the timer is temporarily stopped. At this time, the count value is retained and an image is continuously displayed.

In step S213, the process stands by until the reproduction key 110 is depressed, and when the depression is detected, the process goes to step S214. As a result, during the period until the reproduction key 110 is depressed, an image based upon the same photo file is displayed.

In step S214, the count operation of the timer starts again from the retained count value. After this, the process goes to step S218.

Meanwhile, if, for example, the flash key 109, the fast-forward key 111, the rewind key 112 and so on are depressed after completion of step S212, operations based upon the respective key depressions may be carried out. That is, processing is carried out as if the depressions of these keys were detected in steps S204 and S208. At this time, the count operation of the timer starts again.

In step S215, if the depression of the reproduction key 110 is detected, the process goes to step S216, and if not, it goes to step S218. In step S215, only if a slide show in the forward direction at the normal speed is not currently being carried out (e.g., when operations based upon depressions of the fast-forward key 111, the rewind key 112, the slow key 114 and so on are being performed) is transition to step S216 carried out.

In step S216, if the direction setup is the backward direction, the direction setup is changed to the forward direction.

In step S217, the timer setup value is changed to 10 seconds which is the normal value. As a result, a slide show in the forward direction at a normal speed is carried out. After this, the process goes to step S218.

In step S218, it is determined whether the count value of the timer has reached the setup value. If it has not reached the setup value, the process goes to step S219, and if it has reached the setup value, the process goes to step S207. As a result, a timer setup value set in accordance with the depressions of the fast-forward key 111, the rewind key 112 and the reproduction key 110, is applied and a count operation is carried out, and when the count is completed, the process goes to step S207 and the next photo file is read out, and its images are reproduced and output.

In step S219, it is determined whether the termination of processing was requested by an input operation such as, for example, selection of a virtual channel and power-off, and if it has not been requested, the process returns to step S204.

Meanwhile, although it was omitted in the above-described flow chart, the timer setup value is set to a time (30 seconds) which is longer than the normal time in case, for example, the slow key 114 is depressed, and then the process goes to step S218. As a result, the display interval of images is elongated. In addition, if the cue key 115 is depressed, the process goes to step S202 after the first photo file in the selected album has been obtained.

By the above-described processing, it is possible to control the reproducing operation of photo content by operations which are similar in sensory perception to those for moving image content. Therefore, there is no need to provide an operation key on the remote controller 100 for controlling reproduction of photo content, and it is possible for a user who is familiar with operations for moving image content to readily browse photo content without learning a new operation method.

Figure 12:
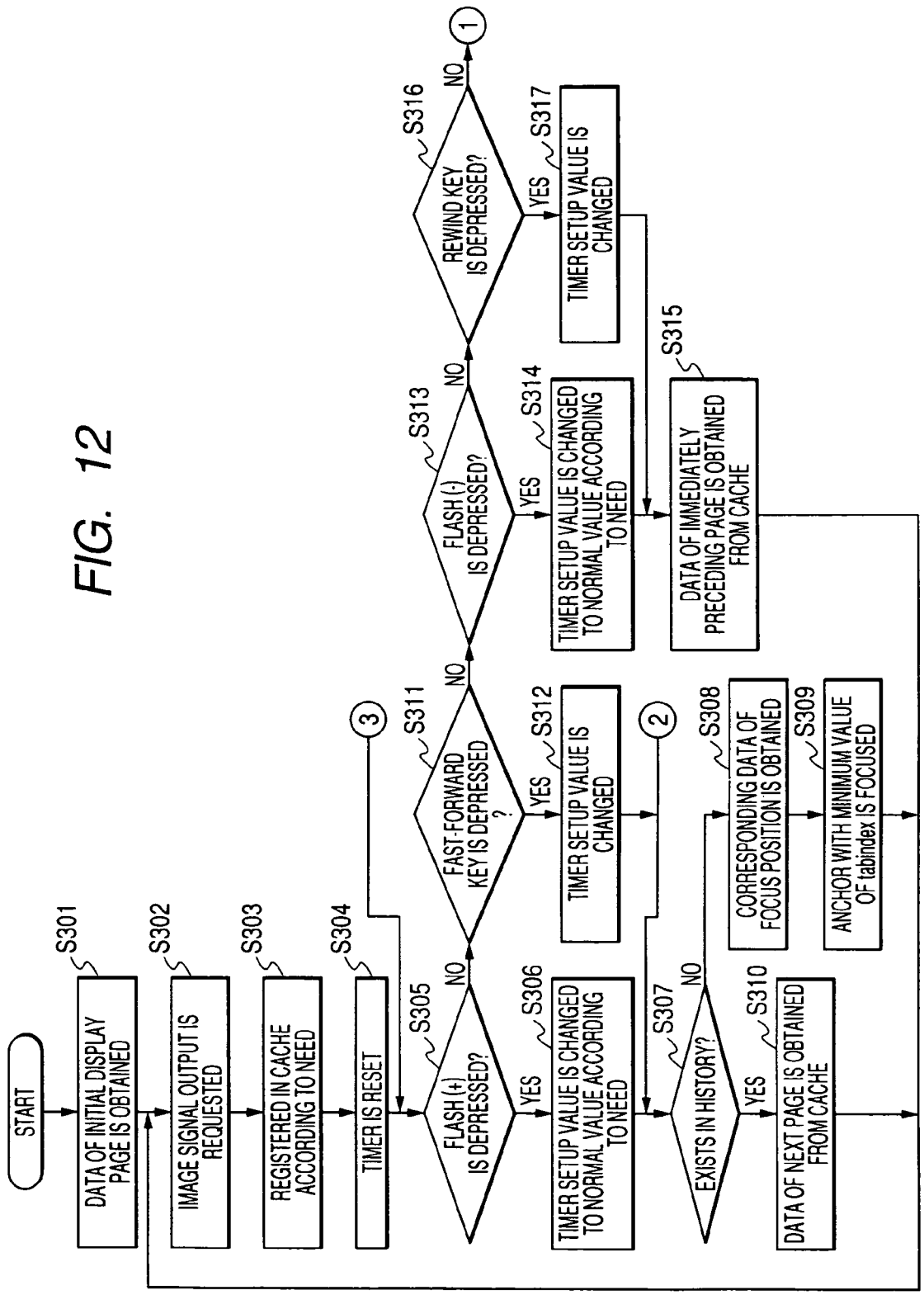
FIG. 12 is a first flow chart which shows the processing in a Web content processing unit in the case that Web content is selected as the virtual channel.
Figure 13:
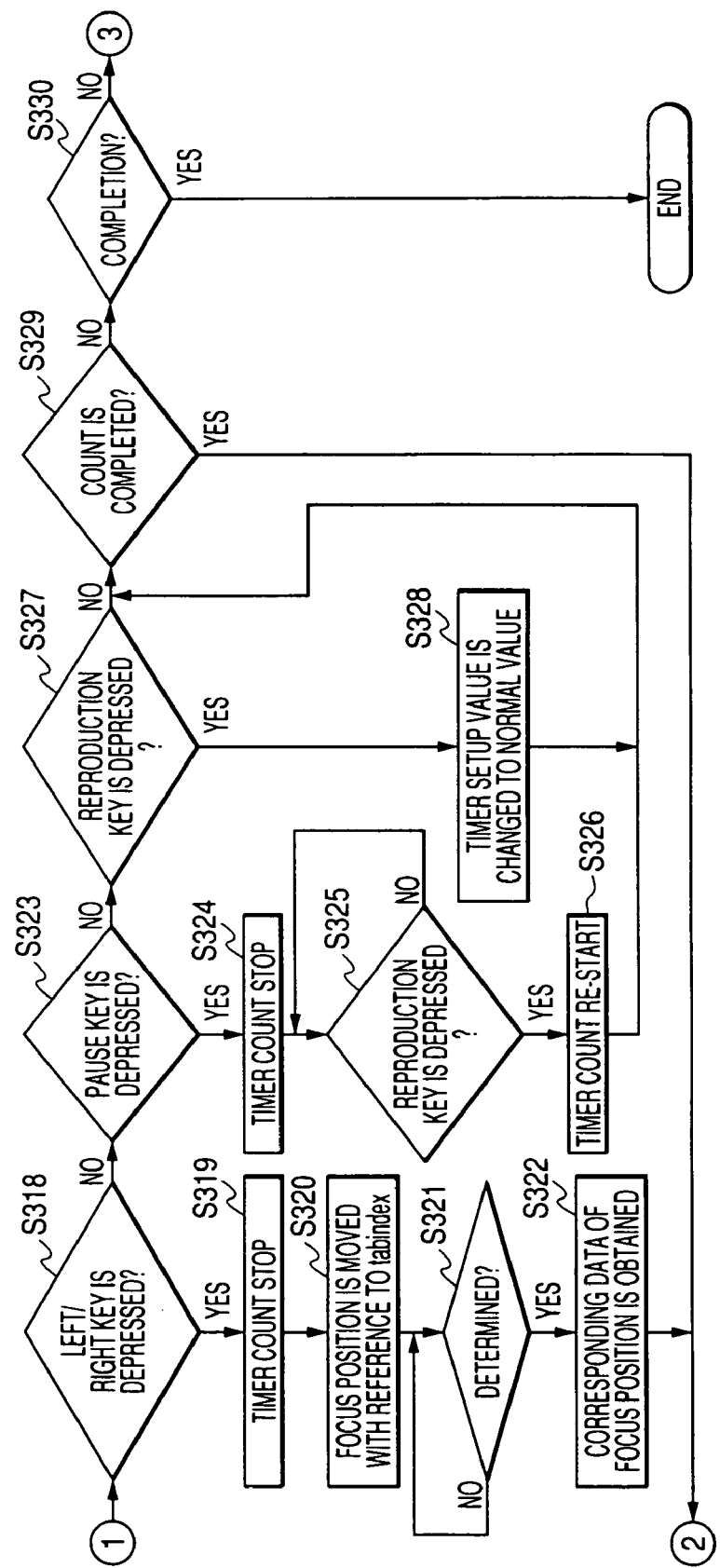
FIG. 13 is a second flow chart which shows the processing in the Web content processing unit in the case that Web content is selected as the virtual channel.

Next, FIGS. 12 and 13 are flow charts which show the processing in the Web content processing unit 60 when Web content is selected as the virtual channel.

In step S301, data of a predetermined initial display page is obtained. More particularly, the Web content management unit 61 obtains the URL of the predetermined initial display page with reference to the initial display setup data 60a. An initial display page which is selected at this time is referred to as an initial display page for which automatic link was carried out for the last time until then.

Then, if data of a Web page which corresponds to the obtained URL exists in the data cache region 60b, this data is read out and supplied to the Web browse processing unit 62. If the data does not exist in the data cache region 60b and, for example, if a predetermined period or more has passed since the last access of data in this region, the URL is supplied to the communication control unit 63 through the Web browse processing unit 62, and access is requested. As a result, the communication control unit 63 receives data of a Web page from the supplied URL, and supplies it to the Web browse processing unit 62.

In step S302, by the processing of the Web browse processing unit 62, the obtained data is analyzed, image data of the Web page is generated, and the image data is output to the image output processing circuit 5, and an output of image signals is requested. As a result, an image of the Web page is displayed on a display.

In step S303, if data of a Web page which is currently being displayed does not exist at this time in the data cache region 60b, this data is registered in the data cache region 60b.

In step S304, the count value of a timer for obtaining the image display time is reset.

In step S305, if the depression of the operation key 109a showing the forward direction among the flash key 109 was detected, the process goes to step S306, and if not, it goes to step S311.

In step S306, if the timer setup value is not the normal value (30 seconds), it may be changed to the normal value.

In step S307, it is determined whether the data of a Web page with a URL which corresponds to the link anchor highlighted in a currently displayed Web page exists at this time in the data cache region 60b. If the data does not exist in the data cache region 60b, the process goes to step S308, and if the data does exist in the data cache region 60b, the process goes to step S310.

In step S308, the data of a Web page with a URL which corresponds to the highlighted link anchor is obtained. More particularly, the URL is supplied through the Web browse processing unit 62 to the communication control unit 63, and access is requested. As a result, the communication control unit 63 receives the data of the Web page from the supplied URL, and supplies it to the Web browse processing unit 62.

In step S309, a setup value of "tabindex attribute" is extracted from the obtained data, and a link anchor whose setup value is a minimum is highlighted. After this, the process goes back to step S302. As a result, it is jumped to a link destination which corresponds to the highlighted link anchor, and the next Web page is displayed. The Web page displayed at this time is in such a state that a link anchor in which the value of "tabindex attribute" is minimum is highlighted.

In step S310, data of a corresponding Web page is obtained from the data cache region 60b. That is, data read out from the data cache region 60b is supplied to the Web browse processing unit 62. After this, the process goes back to step S302, and the next Web page is displayed.

In addition, in step S311, if the depression of the fast-forward key 111 is detected, the process goes to step S312, and if not, it goes to step S313.

In step S312, the timer setup value is changed. At this time, every time each key is depressed one time (i.e., every time step S312 is carried out as to each key), the timer setup value is changed in the order of 10 seconds and 6 seconds. As a result, the timer setup value is changed to an interval which is shorter than the normal value. After this, the process goes to step S307, and the next Web page is displayed at a display interval which is shorter than the normal value.

In addition, in step S313, if the depression of the operation key 109b showing the backward direction is detected, the process goes to step S314, and if not, it goes to step S316.

In step S314, if the timer setup value is not the normal value (30 seconds), it may be changed to the normal value.

In step S315, the data of a Web page with a URL which corresponds to a link anchor highlighted at this time is obtained from the data cache region 60b. That is, this data is read out and supplied to the Web browse processing unit 62. Then, the process goes to step S302, and an image of a Web page which was displayed during the last minute is displayed.

In addition, in step S316, if the depression of the rewind key 112 is detected, the process goes to step S317, and if not, it goes to step S318.

In step S317, the timer setup value is changed. At this time, every time each key is depressed one time (i.e., every time step S317 is carried out as to each key), the timer setup value is changed in the order of 10 seconds and 6 seconds. As a result, the timer setup value is changed to an interval which is shorter than the normal value. After this, the process goes to step S315, and the next Web page is displayed at a display interval which is shorter than the normal value.

In addition, in step S318, if the depression of the left/right key 108c or 108d is detected, the process goes to step S319, and if not, it goes to step S323.

In step S319, the count operation of the timer is stopped. At this time, the count value is retained and an image is continuously displayed.

In step S320, if the left/right key 108c is depressed, with reference to a setup value of "tabindex attribute" in the data of the currently displayed Web page, the highlighted position is moved to a link anchor in which the setup value is the next-higher value than the setup value of the currently highlighted link anchor. In addition, if the depression of the left/right key 108c is detected, the highlight position is moved to the next-lower setup link anchor.

In step 321, the depression of the decision key 108e (or the operation key 109a among the flash key 109) is waited for, and when the depression is detected, the process goes to step S322.

In step S322, the URL which corresponds to a link anchor at the moved highlighted position is obtained from the data of the current Web page, and the data of the Web page with this URL is obtained. That is, this URL is supplied through the Web browse processing unit 62 to the communication control unit 63, and access is requested. As a result, the communication control unit 63 receives data of a Web page from the supplied URL, and supplies it to the Web browse processing unit 62. Then, the process goes back to step S307, and the Web page at the link destination is displayed.

Meanwhile, if, for example, the fast-forward key 111, the rewind key 112, the operation key 109b and so on are depressed after completion of step S320, operations based on the respective key depressions may be carried out. That is, the processing that takes place when the depressions of these keys are detected in steps S311, S316 and S313 is carried out. At this time, the count operation of the timer is started again.

In addition, in step S323, if the depression of the pause key 113 is detected, the process goes to step S324, and if not, it goes to step S327.

In step S324, the count operation of the timer is temporarily stopped. At this time, the count value is retained, and an image is continuously displayed.

In step S325, the process stands by until the reproduction key 110 is depressed, and when the depression is detected, the process goes to step S326. As a result, during the period until the reproduction key 110 is depressed, an image based upon the same photo file is displayed.

In step S326, the count operation of the timer starts again from the retained count value. After this, the process goes to step S329.

Meanwhile, if, for example, the operation keys 109a and 109b of the flash key 109, the fast-forward key 111, the rewind key 112 and so on are depressed after completion of step S324, operations based upon the respective key depressions may be carried out. That is, processing may be carried out as if the depressions of these keys were detected in steps S305, S313, S311 and S316. At this time, the count operation of the timer starts again.

In step S327, if the depression of the reproduction key 110 is detected, the process goes to step S328, and if not, it goes to step S329. In step S327, only if an automatic link in the forward direction at the normal speed is not currently being carried out (e.g., when operations based upon depressions of the fast-forward key 111, the rewind key 112, the slow key 114 and so on are being performed) is transition to step S328 carried out.

In step S328, the timer setup value is changed to 30 seconds which is the normal value. Then, the process goes to step S329.

In step S329, it is determined whether the count value of the timer has reached the setup value. If it has not reached the setup value, the process goes to step S330, and if it has reached the setup value, the process goes to step S307. As a result, a timer setup value set in accordance with the depressions of the flash key 109, the fast-forward key 111, the rewind key 112 and the reproduction key 110, is applied and a count operation is carried out, and when the count is completed, the process goes to step S307 and the next Web page is displayed.

In step S330, it is determined whether the termination of processing was requested by an input operation such as, for example, selection of another virtual channel, power-off, etc., and if it has not been requested, the process returns to step S305.

Meanwhile, in the above-described processing, a value of "tabindex attribute" was used for selecting a link anchor, but a link destination may be automatically selected by another method. For example, the source code in HTML of a Web page which is displayed may be scanned, and the URL of a link destination which appears at the beginning may be extracted and a next link destination determined. Alternatively, information for determining the order of priority on the occasion of selection may be included in advance in a URL which is associated with a link anchor, and the next link destination may be decided on the basis of that URL.

By the above-described processing, it is possible to control operations for browsing Web content by operations which are similar in sensory perception to those for moving image content. Therefore, there is no need to provide an operation key on the remote controller 100 for controlling reproduction of Web content, and operational procedures are substantially unified between different content including video content and photo content, so that operability by a user is improved.

In addition, a link anchor is automatically selected, and Web pages are changed, and therefore, the burden of a selection operation by a user is alleviated, and it is easy to reflect the intention of an author of Web content.

Meanwhile, in the descriptions of steps S204, S208, S211, S213, S215, S305, S311, S316, S318, S321, S323, S325 and S327 in the flow charts of FIGS. 11 through 13, a determination is made as to which key was depressed in order to explain the response of a key operation in a way easy to understand, but in practice, such determination is carried out in the main control unit 20.

In addition, it is possible to apply the invention to, for example, an apparatus in which the above-described image recording and reproducing apparatus, a display for displaying images, an amplifier and a speaker for outputting sounds, and so on are integrated.

In addition, in the above-described image recording and reproducing apparatus, the HDD was disposed as a recording medium which is capable of storing a temporary file of data of photo content, Web content, and so on, together with video content with long hours such as several hours, etc., but another recording medium may be applied. It is desirable for this other recording medium to have a relatively high capacity with high speed random access.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system, comprising:
a processor, including:
a first selection unit operable to receive a user selection from among a broadcast content virtual channel, a web content virtual channel, a video content virtual channel, and a photo content virtual channel, and
an apparatus operable to continuously reproduce web pages in response to the web content virtual channel being selected, the apparatus comprising:
an initial display page registration unit operable to register a plurality of web pages as initial display pages,
a second selection unit operable to receive a selection of one of the initial display pages,
a web page reproducing unit operable to obtain markup language data of the selected initial web page, the markup language data including a plurality of link anchors associated with that web page and an attribute for defining an order of priority for each one of the plurality of link anchors, the attribute being a numerical value, and to reproduce the selected initial web page including the plurality of associated link anchors, and
an operation control unit operable to automatically select the link anchor having a highest priority among the plurality of link anchors displayed on the reproduced web page based on the attribute included in the markup language data of the selected initial web page, the link anchor having the highest priority having an attribute of smallest numerical value, to obtain markup language data for a destination web page indicated by the automatically selected link anchor, to reproduce the destination web page after a predetermined time interval has elapsed, and to repeat the automatically select, the obtain, and the reproduce operations using the link anchor having an attribute having a next smallest numerical value until continuous reproduction is terminated;
wherein the processor is further configured to provide an indication of a capacity of a storage medium based upon stored content respectively associated with one or more of the virtual channels.

2. A method of continuously reproducing web pages, the method comprising:
using a processor to carry out the following:
receiving a user selection from among a broadcast content virtual channel, a web content virtual channel, a video content virtual channel, and a photo content virtual channel, and in response to the web content virtual channel being selected,
registering a plurality of web pages as initial display pages,
receiving a selection of one of the initial display pages,
obtaining markup language data of a selected initial web page, the markup language data including a plurality of link anchors associated with that web page and an attribute for defining an order of priority for each one of the plurality of associated link anchors, the attribute being a numerical value,
reproducing the selected initial web page including the plurality of link anchors,
automatically selecting the link anchor having a highest priority among the plurality of link anchors displayed on the reproduced web page based on the attribute included in the markup language data of the selected initial web page, the link anchor having the highest priority having an attribute of smallest numerical value,
obtaining markup language data for a destination web page indicated by the automatically selected link anchor,
reproducing the destination web page after a selected initial time interval has elapsed, and
repeating the automatically selecting, obtaining, and reproducing steps using the link anchor having an attribute having a next smallest numerical value until continuous reproduction is terminated;
wherein the processor is further configured for providing an indication of a capacity of a storage medium based upon stored content respectively associated with one or more of the virtual channels.

3. A method as set forth in claim 2, wherein the automatically selecting step includes highlighting the link anchor having the highest priority among the plurality of link anchors, the order of priority defining an order in which the plurality of link anchors are to be individually highlighted on the reproduced web page.

4. A method as set forth in claim 2, further comprising:
using the processor to carry out the following:
receiving a user instruction to select a link anchor having a next highest priority among the plurality of link anchors displayed on the reproduced web page during the predetermined time interval, and
automatically selecting the link anchor having the next highest priority.

5. A method as set forth in claim 2, further comprising:
using the processor to carry out the following:
receiving, during the predetermined time interval, a user instruction to interrupt the predetermined time interval, and
receiving a user instruction to resume the predetermined time interval.

6. A method as set forth in claim 2, further comprising:
using the processor to carry out the following:
receiving, during the predetermined time interval, a user instruction to lengthen or shorten the predetermined time interval.

7. A system, comprising:
a processor, including:
  means for receiving a user selection from among a broadcast content virtual channel, a web content virtual channel, a video content virtual channel, and a photo content virtual channel, and
  an apparatus operable to continuously reproduce web pages in response to the web content virtual channel being selected, the apparatus comprising:
    means for registering a plurality of web pages as initial display pages,
    means for receiving a selection of one of the initial display pages,
    means for obtaining markup language data of a selected initial web page, the markup language data including a plurality of link anchors associated with that web page and an attribute for defining an order of priority for each one of the plurality of associated link anchors, the attribute being a numerical value, and for reproducing the selected initial web page including the plurality of link anchors, and
    means for automatically selecting the link anchor having a highest priority among the plurality of link anchors displayed on the reproduced web page based on the attribute included in the markup language data of the selected initial web page, the link anchor having the highest priority having an attribute of smallest numerical value, for obtaining markup language data for a destination web page indicated by the automatically selected link anchor, for reproducing the destination web page after at predetermined time intervals has elapsed, and for repeating the automatically selecting, obtaining, and reproducing operations using the link anchor having an attribute having a next smallest numerical value until continuous reproduction is terminated;
  wherein the processor is further configured to provide an indication of a capacity of a storage medium based upon stored content respectively associated with one or more of the virtual channels.

8. An apparatus as set forth in claim 7, wherein the means for automatically selecting highlights the link having the highest priority among the plurality of link anchors, the order of priority defining an order in which the plurality of link anchors are to be individually highlighted on the reproduced web page.

9. An apparatus as set forth in claim 7, wherein the processor further comprises:
means for selecting, during the predetermined time interval, the link anchor having a next highest priority among the plurality of link anchors displayed on the reproduced web page, and for automatically selecting the link anchor having the next highest priority.

10. An apparatus as set forth in claim 7, wherein the processor further comprises:
means for receiving, during the predetermined time interval, a user instruction to interrupt the predetermined time interval, and means for receiving a user instruction to resume the predetermined time interval.

11. An apparatus as set forth in claim 7, wherein the processor further comprises:
means for receiving, during the predetermined time interval, a user instruction to lengthen or shorten the predetermined time interval.

* * * * *